(12) United States Patent
Wifvesson et al.

(10) Patent No.: US 12,231,875 B2
(45) Date of Patent: Feb. 18, 2025

(54) ESTABLISHING A PROTOCOL DATA UNIT SESSION

(71) Applicant: Telefonaktiebolaget LM Ericsson (publ), Stockholm (SE)

(72) Inventors: Monica Wifvesson, Lund (SE); Noamen Ben Henda, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 521 days.

(21) Appl. No.: 17/436,327

(22) PCT Filed: Feb. 28, 2020

(86) PCT No.: PCT/EP2020/055235
§ 371 (c)(1),
(2) Date: Sep. 3, 2021

(87) PCT Pub. No.: WO2020/178159
PCT Pub. Date: Sep. 10, 2020

(65) Prior Publication Data
US 2022/0174482 A1 Jun. 2, 2022

Related U.S. Application Data

(60) Provisional application No. 62/813,325, filed on Mar. 4, 2019.

(51) Int. Cl.
*H04W 12/033* (2021.01)
*H04W 12/37* (2021.01)
*H04W 76/15* (2018.01)

(52) U.S. Cl.
CPC ......... *H04W 12/033* (2021.01); *H04W 12/37* (2021.01); *H04W 76/15* (2018.02)

(58) Field of Classification Search
None
See application file for complete search history.

(56) References Cited

U.S. PATENT DOCUMENTS

2022/0053390 A1* 2/2022 Kim .................. H04W 36/00

FOREIGN PATENT DOCUMENTS

WO    WO 2018/167307 A1    9/2018

OTHER PUBLICATIONS

International Search Report and Written Opinion of the International Searching Authority, PCT/EP2020/055235, mailed Jun. 15, 2020, 12 pages.

(Continued)

*Primary Examiner* — Mazda Sabouri
(74) *Attorney, Agent, or Firm* — Sage Patent Group

(57) ABSTRACT

A method performed by a core network node in a core network of a wireless communication system includes receiving a first request to establish a first protocol data unit, PDU, session between a user equipment, UE and a user plane function in the core network, generating user plane, UP, security enforcement information, to be applied to the first PDU session, transmitting the UP security enforcement information to a radio access network, RAN, node for establishing the first PDU session, and storing the UP security enforcement information for use in establishing a subsequent PDU session for the UE.

19 Claims, 23 Drawing Sheets

(56) References Cited

OTHER PUBLICATIONS

3rd Generation Partnership Project; Technical Specification Group Services and System Aspects; Study on enhancement of Ultra-Reliable Low-Latency Communication (URLLC) support in the 5G Core network (5GC) (Release 16) 3GPP TR 23.725 V16.0.0 (Dec. 2018) 76 pages.

3rd Generation Partnership Project; Technical Specification Group Services and System Aspects; System Architecture for the 5G System; Stage 2 (Release 15) 3GPP TS 23.501 V15.4.0 (Dec. 2018) 236 pages.

3rd Generation Partnership Project; Technical Specification Group Services and System Aspects; 3GPP System Architecture Evolution (SAE); Security architecture (Release 15) 3GPP TS 33.401 V15.6.0 (Dec. 2018) 163 pages.

3rd Generation Partnership Project; Technical Specification Group Services and System Aspects; Security architecture and procedures for 5G system (Release 15) 3GPP TS 33.501 V15.3.1 (Dec. 2018) 25 pages.

3rd Generation Partnership Project; Technical Specification Group Radio Access Network; Evolved Universal Terrestrial Radio Access (E-UTRA) and NR; Multi-connectivity; Stage 2 (Release 15) 3GPP TS 37.340 V15.4.0 (Dec. 2018) 67 pages.

First Office Action, Japanese Patent Application No. 2021-552703, mailed Sep. 30, 2022, 8 pages.

"Support of UP Security Policy in ng-eNB," 3GPP TSG SA WG3 (Security) Meeting #93, S3-183667, Nov. 12-16, 2018, Spokane (USA), 5 pages.

3GPP TR 33.825 V0.3.0 (Jan. 2019) $3^{rd}$ Generation Partnership Project; Technical Specification Group Services and System Aspects; Study on the Security for 5G URLLC (Release 16) 16 pages.

Notice of Allowance, Japanese Patent Application No. 2021-552703, mailed Apr. 27, 2023, 6 pages.

"Clarifications to solution #1 on dual connectivity based user plane redundancy," 3GPP TSG-SA WG2 Meeting #128bis, Sophia Antipolis, France, Aug. 20-24, 2018, S2-187765, Ericsson, 10 pages.

"Correction to solution #3 'Security policy handling for redundant data transmission," 3GPP TSG-SA WG3 Meeting #94Ad-Hoc, Stockholm (Sweden), Mar. 11-15, 2019, S3-190820, Ericsson, 3 pages.

\* cited by examiner

ESTABLISHING A PROTOCOL DATA UNIT SESSION

TECHNICAL FIELD

The present disclosure relates generally to wireless communication systems, and more particularly, to establishing protocol data unit sessions in wireless communication systems and related wireless devices, network nodes, computer programs, and computer program products.

BACKGROUND

A simplified wireless communication system is illustrated in FIG. 1A. The system includes a UE 100 that communicates with one or more access nodes 210, 220 using radio connections 107, 108. The access nodes 210, 220 are connected to a core network node 106. The access nodes 210-220 are part of a radio access network 105.

For wireless communication systems pursuant to the 3GPP Evolved Packet System, EPS standard, the access nodes 210, 220 correspond typically to an Evolved NodeB (eNB) and the core network node 106 corresponds typically to either a Mobility Management Entity (MME) and/or a Serving Gateway (SGW). The eNB is part of the radio access network (RAN) 105, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS, standard, the access nodes 210-220 correspond typically to a 5G NodeB (gNB) and the core network node 106 corresponds typically to either an Access and Mobility Management Function (AMF) and/or a User Plane Function (UPF). The gNB is part of the radio access network 105, which in this case is the NG-RAN (Next Generation Radio Access Network), while the AMF and UPF are both part of the 5G Core Network (5GC).

It is expected that 5G will support many new scenarios and use cases and will be an enabler for the Internet of Things (IoT). It is expected that NG systems will provide connectivity to a wide range of new devices such as sensors, smart wearables, vehicles, machines, etc. Flexibility would be then a key property in NG Systems. This is reflected in the security requirement for network access that are mandating the support of alternative authentication methods and different types of credentials than the usual AKA credentials pre-provisioned by the operator and securely stored in the UICC. This would allow factory owners or enterprises to leverage their own identity and credential management systems for authentication and access network security.

FIG. 1B illustrates an example 5G system architecture; see 3GPP TS 23.501 [1] for further details. As shown in FIG. 1B, functional entities (e.g., AMF, SMF, etc.) are connected via a communications link. The Access and Mobility Management Function (AMF) communicates with the radio access network (RAN) and one or more user equipments (UE), and the session management function (SMF) communicates with the user plane function (UPF). This way of modelling the system is also known as "service-based architecture."

The various functions illustrated in FIG. 1B will now be described.

The Access and Mobility Management function (AMF) supports termination of non-access stratum (NAS signalling), NAS ciphering and integrity protection, registration management, connection management, mobility management, access authentication and authorization, security context management.

The Session Management function (SMF) supports session management (session establishment, modification, release), UE Internet Protocol (IP) address allocation and management, Dynamic Host Configuration Protocol (DHCP) functions, termination of NAS signalling related to session management, downlink (DL) data notification, and traffic steering configuration for user plane function (UPF) for proper traffic routing.

The User plane function (UPF) supports packet routing and forwarding, packet inspection, Quality of Service (QoS) handling, acts as external Protocol Data Unit (PDU) session point of interconnect to Data Network (DN), and is an anchor point for intra- and inter-RAT (Radio Access Technology) mobility.

The Policy Control Function (PCF) supports unified policy framework, providing policy rules to Control Plane (CP) functions, and access subscription information for policy decisions in a Unified Data Repository (UDR).

The Authentication Server Function (AUSF) acts as an authentication server.

The Unified Data Management (UDM) supports generation of Authentication and Key Agreement (AKA) credentials, user identification handling, access authorization, and subscription management.

The Application Function (AF) supports application influence on traffic routing, accessing Network Exposure Function (NEF), and interaction with policy framework for policy control.

The NEF supports exposure of capabilities and events, secure provision of information from external application to 3GPP network, and translation of internal/external information.

The NF Repository function (NRF) supports service discovery function and maintains the network function (NF) profile and available NF instances.

The Network Slice Selection Function (NSSF) supports selection of the Network Slice instances to serve the UE, determining the allowed Network Slice Selection Assistance Information (NSSAI), and determining the AMF set to be used to serve the UE.

A feature called Dual Connectivity (DC) was introduced in LTE in order to boost the performance of the system allowing to leverage base stations (which is called eNBs in LTE) with a non-ideal backhaul. This feature is realized by a base station endorsing the role of a Master Node (MN) connected to another base station endorsing the role of a Secondary Node (SN) and allowing the MN to utilize the resources of the SN by offloading data radio bearers to the SN.

In the context of 5G, a similar feature called Enhanced Dual Connectivity was introduced in LTE as described in option 3/3a in FIG. 2 to enable usage of the New Radio (NR) which is the 5G radio technology. In this feature the MN is an enhanced eNB and the SN is a gNB (which is a base station providing NR radio access).

This feature, called Dual Connectivity, will be supported, with some enhancements, in 5G systems as well. The network architecture options 4/4a and 7/a for Dual Connectivity in 5G systems involving multiple radio access technology (RAT) and a 5G Core Network (CN) are shown in FIG. 2.

FIG. 3 illustrates a so-called EN-DC architecture in which an EPC core operates with an E-UTRAN network, and the E-UTRAN network includes both eNBs and en-gNBs.

In 5G system, the Multi-RAT Dual Connectivity (MR-DC) architecture is a generalization of the Intra-E-UTRA Dual Connectivity (DC) described above, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the 5GC/NGC. The MN could be either a gNB or an ng-eNB. The SN could be either a gNB or an ng-eNB.

The architecture options 4/4a and 7/a for Dual Connectivity in 5G systems are shown in FIG. 4.

In MR-DC, the UE has a single Radio Resource Control (RRC) state, based on the MN RRC and a single C-plane connection towards the Core Network. FIG. 5 illustrates the Control plane architecture for MR-DC. Each radio node has its own RRC entity (E-UTRA version if the node is an ng-eNB or NR version if the node is a gNB) which can generate RRC PDUs to be sent to the UE.

RRC PDUs generated by the SN can be transported via the MN to the UE. The MN always sends the initial SN RRC configuration via Master Cell Group (MCG) Signalling Radio Bearer SRB (SRB1), but subsequent reconfigurations may be transported via MN or SN. When transporting RRC PDU from the SN, the MN does not modify the UE configuration provided by the SN.

Among the new security features in 5G Systems are the introduction of the integrity protection of the User Plane (UP) and the support for a separate mechanism for the negotiation of the UP security. The term negotiation refers to the procedure for determining whether and which of integrity or confidentiality should be activated for a UP session.

By comparison to LTE, there is no integrity protection for UP and the negotiation of UP confidentiality is integrated in the activation of the security for the Control Plane (CP) in the Access Stratum (AS) between the eNB and the UE. As described in TS 33.401 [3], the security for the AS CP is activated by a run of the AS Security Mode Command (SMC) procedure which allows the selection of the cryptographic algorithms and the activation of the security for the RRC protocol. It is noted that a lower level protocol actually provides the security, namely the Packet Data Convergence Protocol (PDCP) in the AS CP protocol stack. Furthermore, since integrity protection of UP is not supported in LTE and confidentiality protection is mandatory, the confidentiality algorithm selected during the AS SMC mentioned above is automatically used for the protection of the UP traffic.

The new feature for the negotiation of UP security in the 5G System allows the RAN node to receive UP security enforcement information from the Core Network (CN) during the PDU Session establishment procedure (see TS 23.502 [4]). UP security enforcement information provides the NG-RAN with User Plane security policies for a PDU session. For example, the UP security enforcement information indicates whether UP integrity protection and/or UP confidentiality protection is required, preferred or not needed. See 3GPP TS 23.501 [1]. The UP security enforcement information may provide other information, such as a maximum supported data rate for integrity protection provided by the UE.

The UP security policies defined in the UP security enforcement information are applicable on a PDU session level. That is, the RAN applies the UP security enforcement information, received from the CN, to all the Data Radio Bearers (DRBs) serving the PDU session in question. Furthermore, the UP security policy includes security enforcement information, such as separate indications on whether to activate either integrity protection or confidentiality protection or both.

This kind of flexibility is required in the 5G System which is expected to provide connectivity for various types of services and devices. For IoT services, integrity protection would be sufficient in many cases, while for the usual voice and broadband services, as in LTE, confidentiality protection is required.

SUMMARY

An object of the inventive concepts is to streamline the establishment of PDU sessions in a wireless communication network. A method performed by a core network node according to some embodiments in a core network of a wireless communication system includes receiving a first request to establish a first protocol data unit (PDU) session between a user equipment (UE) and a user plane function in the core network, generating user plane (UP) security enforcement information, to be applied to the first PDU session, transmitting the UP security enforcement information to a radio access network (RAN) node for establishing the first PDU session, and storing the UP security enforcement information for use in establishing a subsequent PDU session for the UE.

The method may further include receiving a second request to establish a second PDU session between the UE and the user plane function in the core network.

The method may further include transmitting the UP security enforcement information to the RAN node for establishing the second PDU session.

In some embodiments, storing the UP security enforcement information is performed by a Session Management Function (SMF) in the core network.

The method may further include selecting a user plane function for terminating the second PDU session.

In some embodiments, the second PDU session is established for redundant data transmission with the first PDU session.

In some embodiments, the second PDU session is carried on a data radio bearer, DRB, established between the UE and a secondary node.

In some embodiments, storing the UP security enforcement information is performed by the core network.

In some embodiments, storing the UP security enforcement information is performed by a Policy Control Function, PCF, or a United Data Management, UDM, function in the core network.

In some embodiments, the RAN node includes a master node. In some embodiments, the RAN node includes a gNB or an ng-eNB. In some embodiments, the first request is received from the UE.

A core network node according to some embodiments includes a processor circuit, a network interface coupled to the processor circuit, and a memory coupled to the processor circuit. The memory includes machine readable program instructions that, when executed by the processor circuit, cause the network node to perform operations of receiving a first request to establish a first protocol data unit session between a user equipment and a user plane function in the core network, generating user plane security enforcement information, to be applied to the first PDU session, transmitting the UP security enforcement information to a radio access network node for establishing the first PDU session, and storing the UP security enforcement information for use in establishing a subsequent PDU session for the UE.

A core network node according to some embodiments is adapted to receive a first request to establish a first protocol data unit session between a user equipment and a user plane function in the core network, generate user plane security enforcement information, to be applied to the first PDU session, transmit the UP security enforcement information to a radio access network node for establishing the first PDU session, and store the UP security enforcement information for use in establishing a subsequent PDU session for the UE.

Some embodiments provide a computer program including program code to be executed by processor circuit of a core network (CN) node configured to operate in a communication network, whereby execution of the program code causes the CN node to perform operations of receiving a first request to establish a first protocol data unit session between a user equipment and a user plane function in the core network, generating user plane security enforcement information, to be applied to the first PDU session, transmitting the UP security enforcement information to a radio access network node for establishing the first PDU session, and storing the UP security enforcement information for use in establishing a subsequent PDU session for the UE.

Some embodiments provide a computer program product including a non-transitory storage medium including program code to be executed by processor circuit of a CN node configured to operate in a communication network, whereby execution of the program code causes the CN node to perform operations of receiving a first request to establish a first protocol data unit session between a user equipment and a user plane function in the core network, generating user plane security enforcement information, to be applied to the first PDU session, transmitting the UP security enforcement information to a radio access network node for establishing the first PDU session, and storing the UP security enforcement information for use in establishing a subsequent PDU session for the UE.

A method performed by a radio access network node according to some embodiments of a wireless communication system includes receiving a first request to establish a first protocol data unit session between a user equipment connected to the RAN node and a user plane function in the core network, receiving user plane security enforcement information from a core network node, to be applied to the first PDU session, modifying the UP security enforcement information to provide modified UP security enforcement information, storing the modified UP security enforcement information for use in setting up a subsequent PDU session for the UE, and establishing the first PDU session using the modified UP security enforcement information.

The method may further include receiving a second request to establish a second protocol data unit session between the UE and the user plane function in the core network, receiving the UP security enforcement information from the core network node, and establishing the second PDU session using the modified UP security enforcement information.

The method may further include establishing a dual connectivity, DC, connection between the UE and a secondary node, and assigning the second PDU session to the DC connection.

The method may further include transmitting the modified UP security enforcement information to the secondary node for application to the second PDU session.

In some embodiments, the second PDU session is carried on a data radio bearer, DRB, established between the UE and a secondary node.

In some embodiments, the core network node endorses a Session Management Function, SMF. In some embodiments, the RAN node includes a gNB or ng-eNB.

A radio access network node according to some embodiments includes a processor circuit, a network interface coupled to the processor circuit, and a memory coupled to the processor circuit. The memory includes machine readable program instructions that, when executed by the processor circuit, cause the RAN node to perform operations of receiving a first request to establish a first protocol data unit session between a user equipment connected to the RAN node and a user plane function in the core network, receiving user plane security enforcement information from a core network node, to be applied to the first PDU session, modifying the UP security enforcement information to provide modified UP security enforcement information, storing the modified UP security enforcement information for use in setting up a subsequent PDU session for the UE, and establishing the first PDU session using the modified UP security enforcement information.

A radio access network node according to some embodiments is adapted to receive a first request to establish a first protocol data unit session between a user equipment connected to the RAN node and a user plane function in the core network, receive user plane security enforcement information from a core network node, to be applied to the first PDU session, modify the UP security enforcement information to provide modified UP security enforcement information, store the modified UP security enforcement information for use in setting up a subsequent PDU session for the UE, and establish the first PDU session using the modified UP security enforcement information.

Some embodiments provide a computer program including program code to be executed by a processor circuit of a radio access network node configured to operate in a communication network, whereby execution of the program code causes the RAN node to perform operations of receiving a first request to establish a first protocol data unit session between a user equipment connected to the RAN node and a user plane function in the core network, receiving user plane security enforcement information from a core network node, to be applied to the first PDU session, modifying the UP security enforcement information to provide modified UP security enforcement information, storing the modified UP security enforcement information for use in setting up a subsequent PDU session for the UE, and establishing the first PDU session using the modified UP security enforcement information.

Some embodiments provide a computer program product including a non-transitory storage medium including program code to be executed by a processor circuit of a radio access network node configured to operate in a communication network, whereby execution of the program code causes the RAN node to perform operations of receiving a first request to establish a first protocol data unit session between a user equipment connected to the RAN node and a user plane function in the core network, receiving user plane security enforcement information from a core network node, to be applied to the first PDU session, modifying the UP security enforcement information to provide modified UP security enforcement information, storing the modified UP security enforcement information for use in setting up a subsequent PDU session for the UE, and establishing the first PDU session using the modified UP security enforcement information.

BRIEF DESCRIPTION OF THE DRAWINGS

The accompanying drawings, which are included to provide a further understanding of the disclosure, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

3GPP SA2 has performed a study on 5G URLLC in Rel-16 in 3GPP TR 23.725 [2] where URLLC stands for Ultra-Reliable and Low Latency Communication.

To ensure the high reliability (which can be difficult to achieve using only a single path on user plane), extra communication paths to/from the UE may be supported in 5GS. Depending on the condition of network deployment, e.g., which Network Functions (NFs) or segments cannot meet the requirements of reliability, the extra communication paths may be applied on the user plane path between the UE and the network.

Figure 1A:
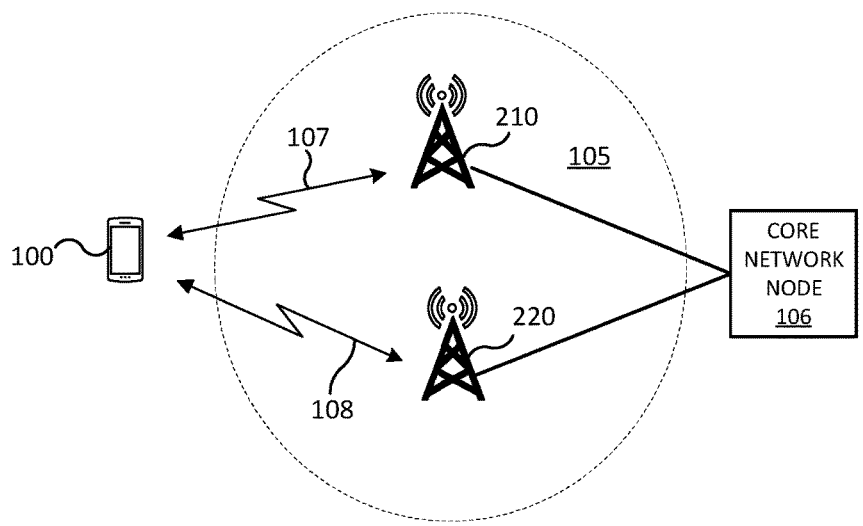
FIG. 1A illustrates a wireless communication system.
Figure 1B:
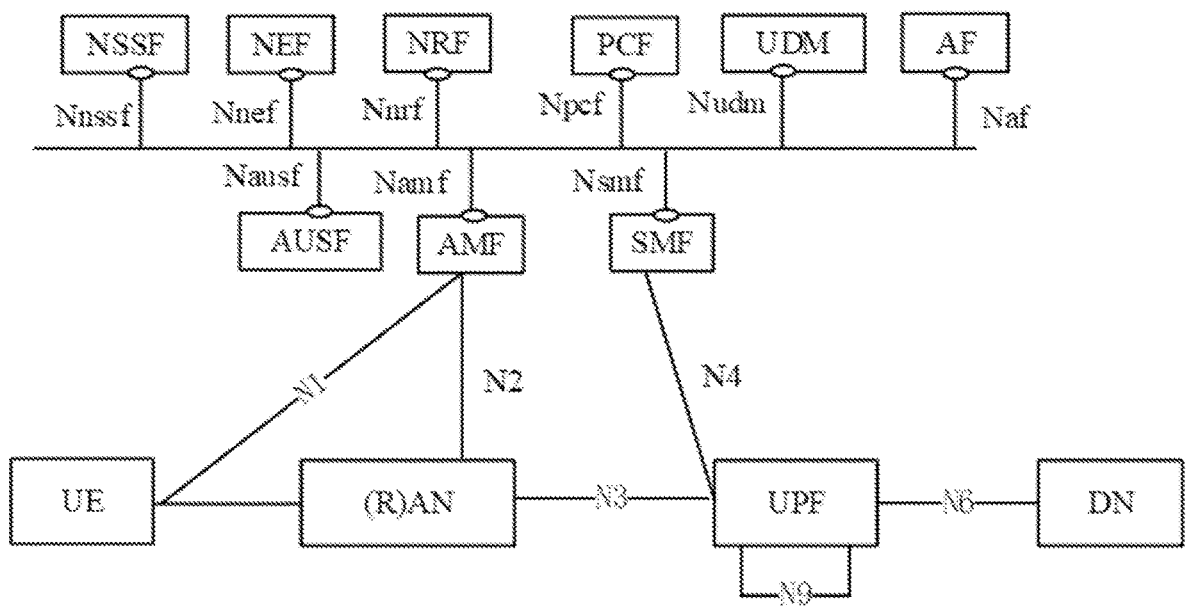
FIG. 1B illustrates an example 5G system architecture.
Figure 2:
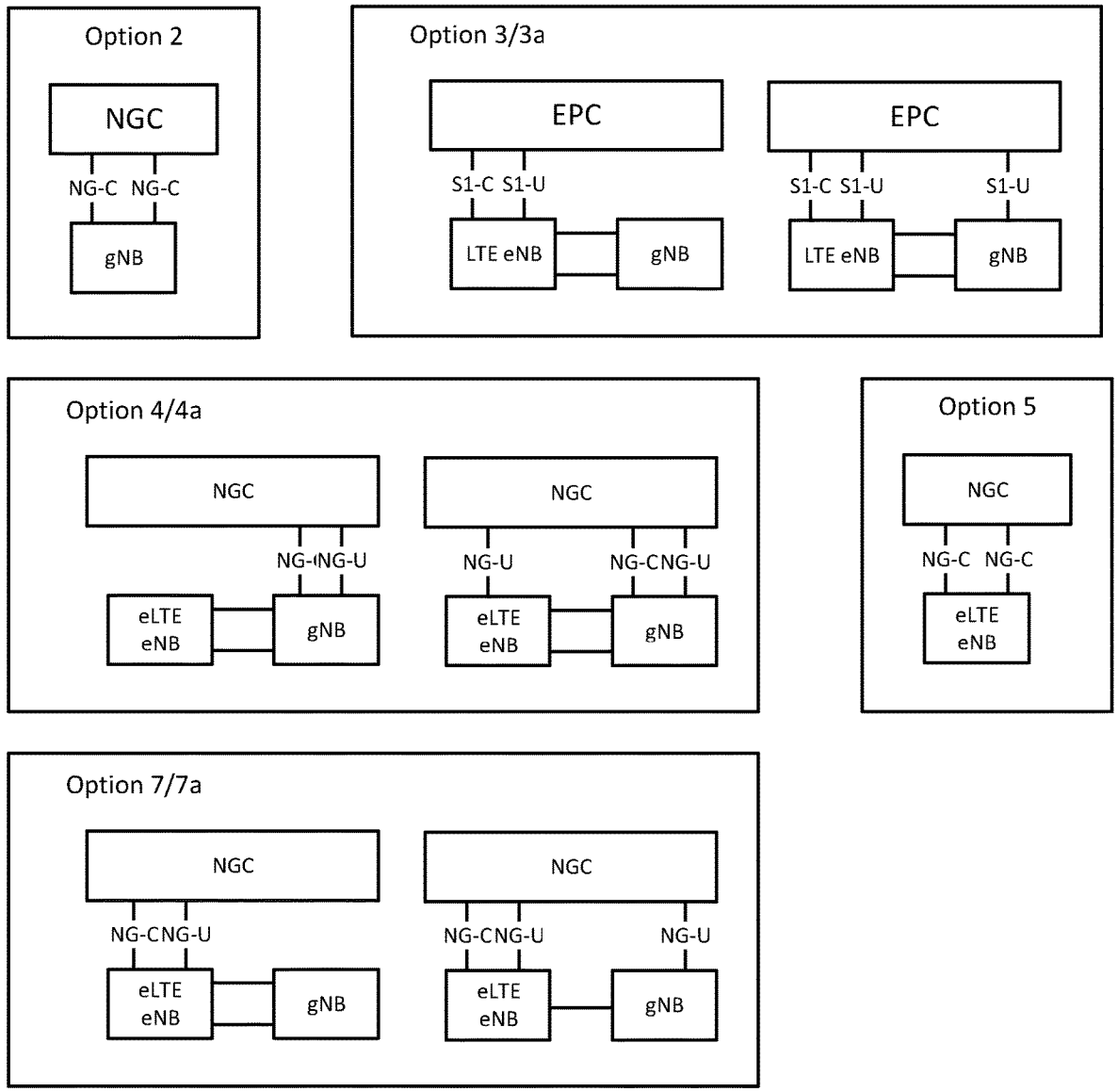
FIG. 2 illustrates various inter-RAT architectures for dual connectivity.
Figure 3:
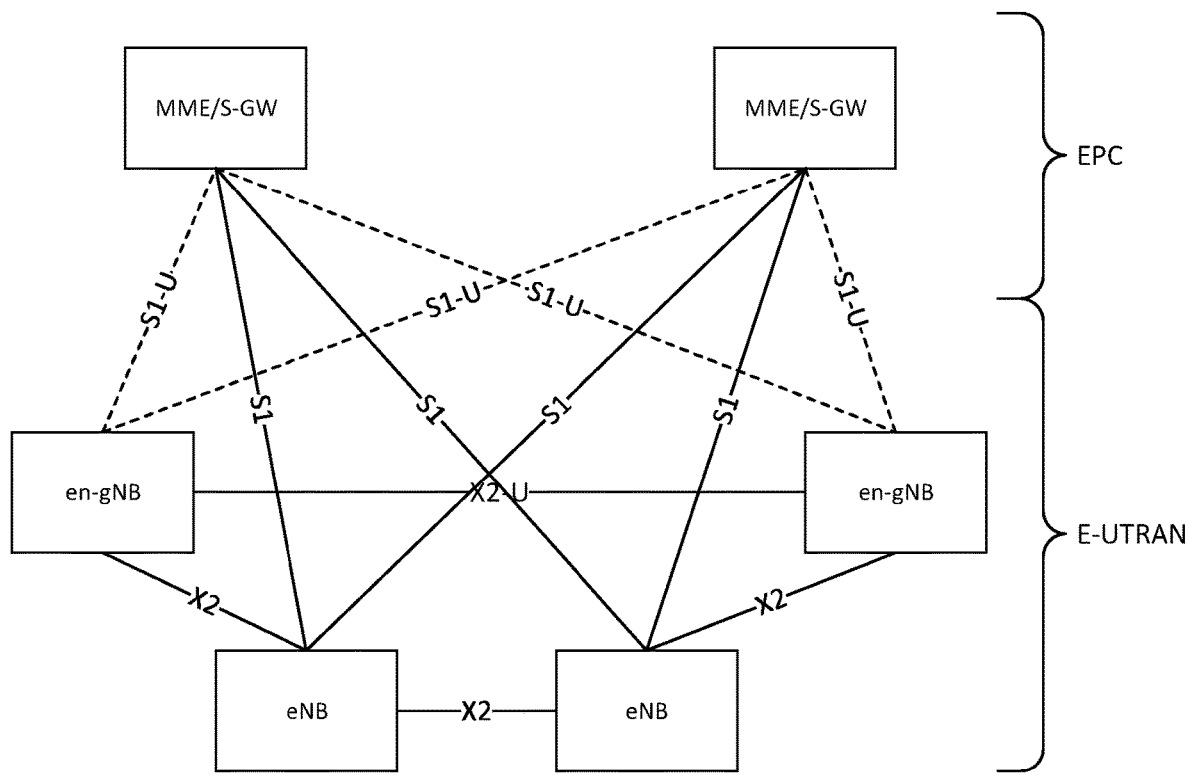
FIG. 3 illustrates an EN-DC architecture.
Figure 4:
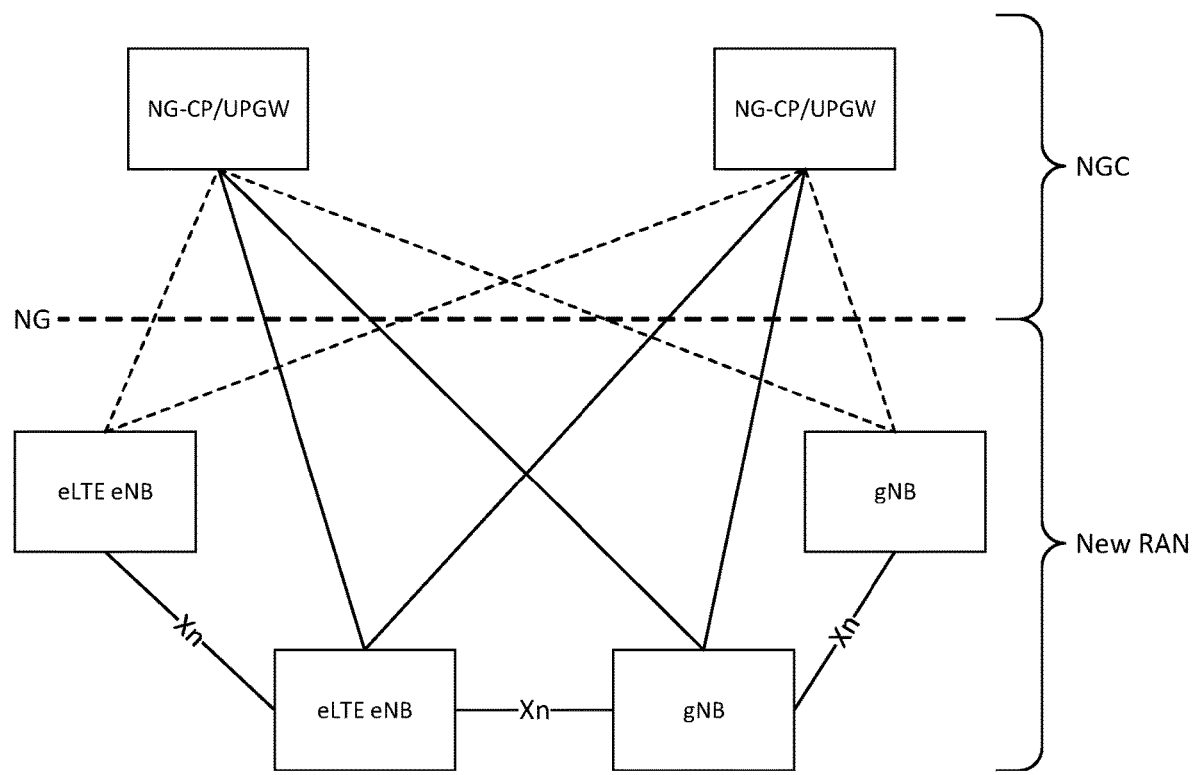
FIG. 4 illustrates an MR-DC architecture.
Figure 5:
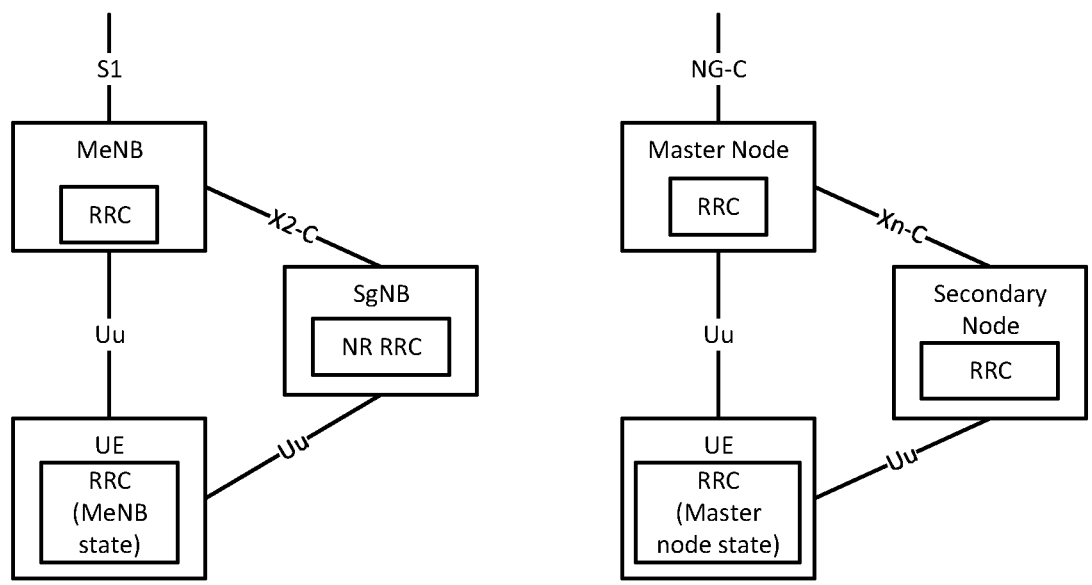
FIG. 5 illustrates a control plane architecture for EN-DC and MR-DC with 5GC.
Figure 6:
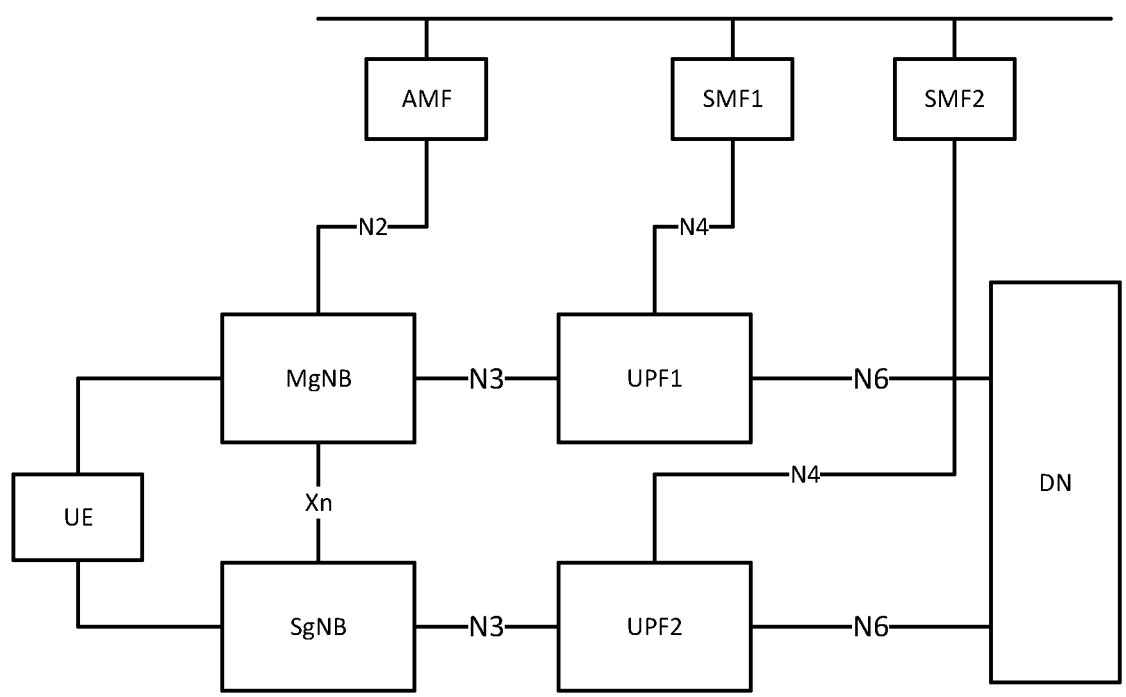
FIG. 6 illustrates an architecture for redundant User Plane paths for URLLC using Dual Connectivity.

In the recommended SA2 solution #1 in 3GPP TR 23.725 [2], the UE establishes two PDU Sessions with the network. Referring to FIG. 6, one PDU Session spans from the UE via Master gNB (MgNB) to UPF1 acting as the PDU Session Anchor, and the other PDU Session spans from the UE via Secondary gNB (SgNB) to UPF2 acting as the PDU Session Anchor. Based on these two PDU sessions, two independent paths are set up. UPF1 and UPF2 connect to the same Data Network (DN), even though the traffic via UPF1 and UPF2 may be routed via different user plane nodes within the DN.

Figure 7:
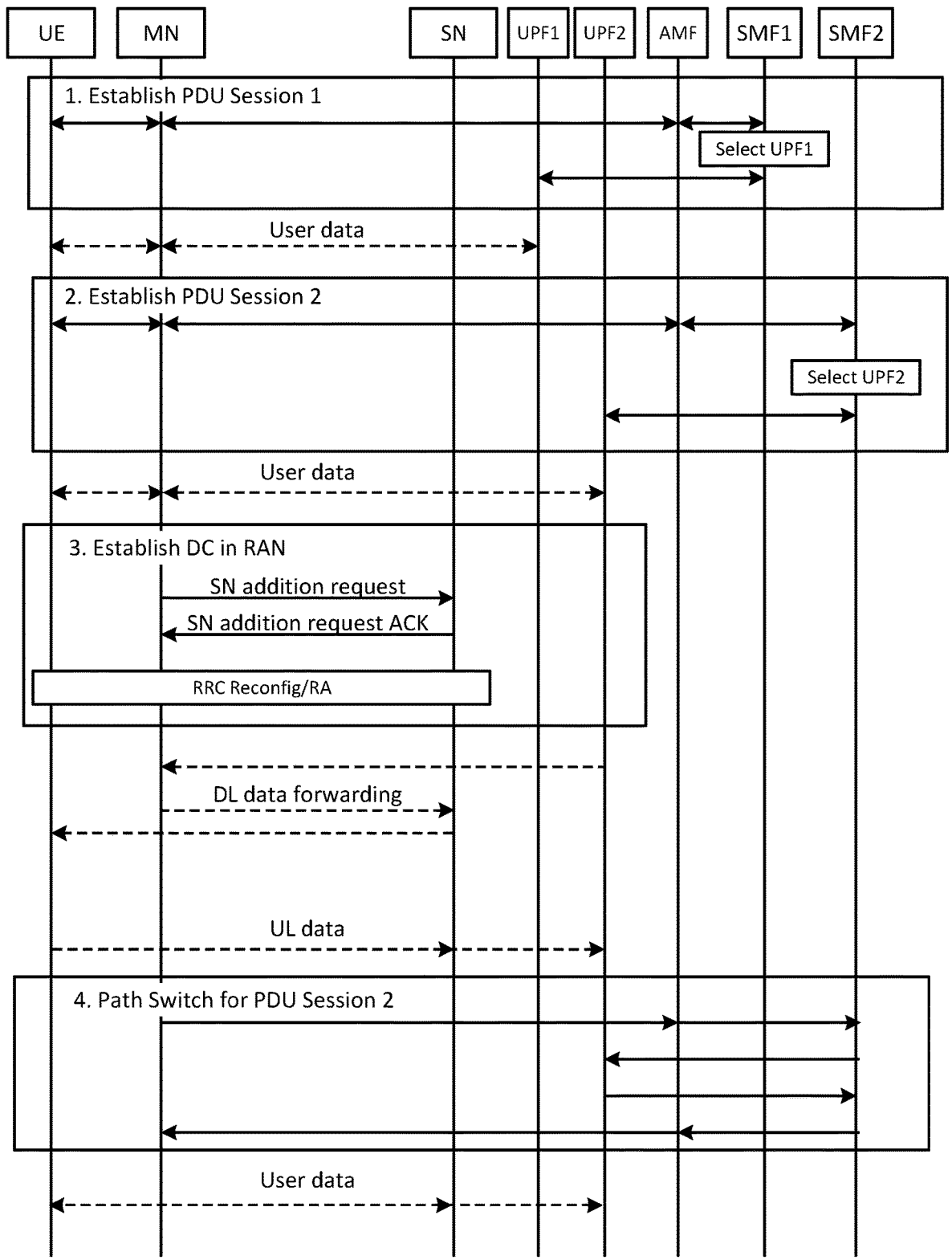
FIG. 7 illustrates a conventional procedure for PDU session establishment.

According to 3GPP TR 23.725 [2] The setup of the two PDU Sessions and the subsequent establishment of dual connectivity takes place as shown in FIG. 7. The Master Node (MN) and/or the Secondary Node (SN) in FIG. 7 may be implemented as a gNB or ng-eNB.

For one PDU Session used for redundant data transmission, it is explicitly requested by the Core Network (e.g., by the SMF in the CN) to MN that the user plane goes via the MN, and for the other (second) PDU Session used for redundant data transmission it is explicitly requested by Core Network to MN that the user plane goes via the SN using dual connectivity. The MN sets up dual connectivity as defined in 3GPP TS 37.340 [5] so that the sessions have end to end redundant paths. This implies that all DRB(s) established for the second PDU session which should go via the SN will be offloaded to the SN by the MN.

It is important in this scenario that the same key is not used for the two redundant user planes (for the first and second PDU sessions). Otherwise if the same key is used for the two redundant user planes, then if one path is compromised then the second path is compromised as well. Also if two different keys are used for the two redundant user planes (for the first and second PDU sessions) then the attacker cannot relate the two data streams.

According to 3GPP TS 23.501 [1], the User Plane Security Policy provides the same or similar level of information as User Plane Security Enforcement information. Once the User Plane Security Enforcement information is determined at the establishment of the PDU session by the SMF, it is provided to the UE and applied for the life time of the PDU session. The User Plane Security Enforcement information provides the gNB or ng-eNB in the NG-RAN with User Plane security policies for a PDU session. It indicates whether UP integrity protection is:

Required: for all the traffic on the PDU session UP integrity protection shall apply.

Preferred: for all the traffic on the PDU session UP integrity protection should apply.

Not Needed: UP integrity protection shall not apply on the PDU session.

It also indicates whether UP confidentiality protection is:

Required: for all the traffic on the PDU Session UP confidentiality protection shall apply.

Preferred: for all the traffic on the PDU Session UP confidentiality protection should apply.

Not Needed: UP confidentiality shall not apply on the PDU Session.

It is the current understanding that in 5G system, a ng-eNB (which is a base station providing LTE radio and connected to a 5G core) acting as a Secondary Node (SN) will not support User Plane integrity protection in 3GPP Release 15.

This creates a potential problem when the capabilities of SN and MN are different. Consider the example of UP integrity protection. In the network architecture options Option 4/4a in the 5G systems for Dual Connectivity, as UP integrity protection cannot be activated in the SN, even though the UP integrity protection is activated in the MN. It is so because in Option 4/4a where a gNB acting as a Master Node, when it receives a User Plane Security Policy from the 5G Core Network that requires UP integrity protection to be activated for all DRBs established for a particular PDU session, the Master Node (MN) could activate the UP integrity protection, but when an ng-eNB is added as a SN, then UP integrity protection for the bearers in SN will fail because the ng-eNB does not support UP integrity protection. Another example is Option 7/7a where the UP integrity protection could have been activated for some bearers in SN because it is a gNB. But if those bearers are transferred to MN, then UP integrity protection activation will fail in the MN because it is ng-eNB.

The assumption in 5G URLLC Rel-16 services is that the User Plane Security Policy for multiple PDU Sessions used for redundant data transmission should have the same setting for the activation status for encryption and for integrity protection. Otherwise, if the attacker knows that integrity protection is enabled on one path but not on a second path, then the attacker could perform jamming on the first path in order to prevent the user plane data to be forwarded from the gNB/ng-eNB to the UPF, and then modify user plane data sent over the second path.

In 5G Dual Connectivity described in TS 33.501 [6] in 3GPP Release 15, the Master Node (MN) can modify the setting received in the User Plane Security Policy from the SMF if it cannot comply to the setting received in the User Plane Security Policy, when the setting is set to the value "preferred" for either encryption or integrity protection or both.

There are some potential issues (Issue 1 and Issue 2) with using this solution for URLLC services when two PDU sessions are established with the UE where the user plane path for the first PDU session goes via Master Node (MN) and the user plane path for the second PDU session goes via Secondary Node (SN).

Issue 1: Different UP security enforcement information (i.e. different security activation for encryption and integrity protection) may be indicated by the SMF for the first PDU session and the second PDU session to the Master Node (MN).

Issue 2: The MN may modify the setting in the UP security enforcement information received from the SMF for the first PDU session, before applying the security to the DRBs for the first PDU session established between the MN and the UE.

When the MN receives the UP security enforcement information from the SMF for the second PDU session (i.e. the user plane path goes via the SN) and offloads the DRBs for the second PDU session to the SN, then the MN may just forward the UP security enforcement information received from the SMF and the SN needs then to comply to the security setting received in the UP security enforcement information received from the MN.

The result would be that the DRBs established with the same UE for the first PDU session and the second PDU session will use different security activation settings.

Some embodiments described herein provide systems/methods and associated procedures by which the UP security enforcement information for the first PDU session can be handled by the core network (i.e. SMF). Moreover, some embodiments described herein provide systems/methods and associated procedures by which the UP security activation status for the DRBs established with the UE for the first PDU session can be handled by the Master Node.

According to some embodiments, the systems/methods described herein may have the following advantages:

First, the same setting in the UP security enforcement information may advantageously be provided by the SMF to the same Master Node (MN) for the first PDU session and the second PDU session used for redundant data transmission, using Dual Connectivity architecture.

Second, the same setting of encryption and integrity protection stored in the UP security activation status and applied to the first PDU session in the Master Node (MN) may be advantageously provided to the Secondary Node and to be applied to the second PDU session. This means that the same UP security activation status may be applied to the DRBs for the first PDU session and the second PDU session.

According to some embodiments, to address the first issue, a UE initiates a PDU establishment procedure with the network for redundant data transmission (such as for supporting URLLC services) for a first PDU session. When the SMF has determined the UP security enforcement information to be applied for the first PDU session, the SMF stores the UP security enforcement information provided to the MN which is applied to the DRB(s) established for the first PDU session between the MN and the UE.

When the same UE initiates a PDU establishment procedure with the network for redundant data transmission for a second PDU session, the SMF provides the same stored UP security enforcement information (which was applied to the first PDU session) to the MN. This UP security enforcement information is applied to the DRB(s) established for second PDU session between the SN and the UE.

Figure 8:
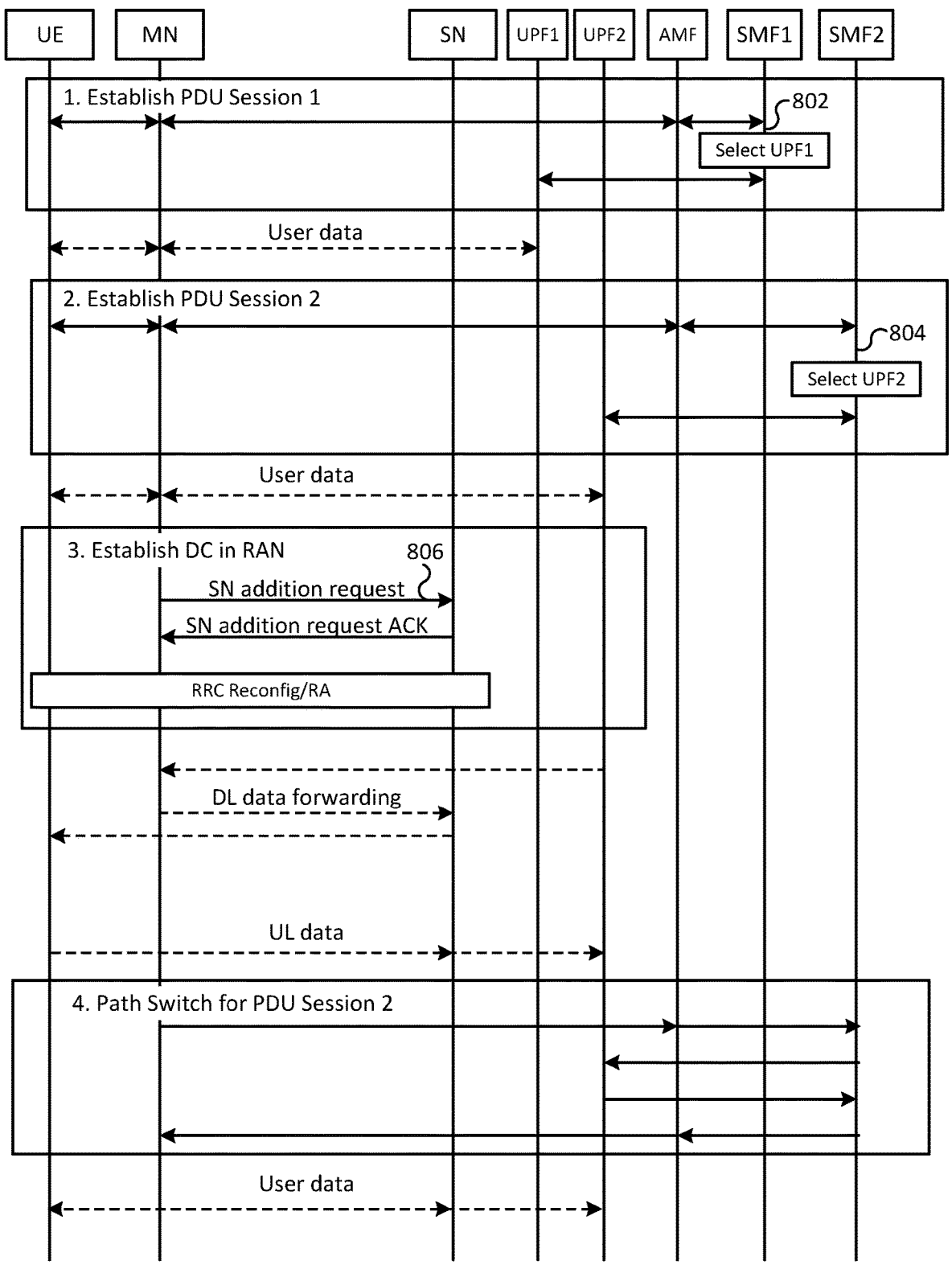
FIGS. 8 and 9 illustrate procedures for PDU session establishment according to embodiments of the inventive concepts.

Referring to FIG. 8, a UE initiates Registration procedure with the network. At step 1, the UE initiates PDU establishment procedure with the network for redundant data transmission (URLLC) for a first PDU session. The SMF determines the UP security enforcement information to be applied for the first PDU session. At 802, the SMF stores the UP security enforcement information before it provides the UP security enforcement information to the MN. The MN then applies the UP security enforcement information received from the SMF to the DRB(s) established for the first PDU session between the MN and the UE.

At step 2, the same UE initiates a second PDU establishment procedure with the network for redundant data transmission for a second PDU session. At 804, the SMF retrieves the stored UP security enforcement information, which was applied to the first PDU session, and provides the stored UP security enforcement information to the MN when requesting a second PDU session. The MN forwards the UP security enforcement information received from the SMF to the SN at 806. The SN applies the UP security enforcement information received from the MN to the DRB(s) established for the second PDU session between the SN and the UE.

To address the second issue, when the MN receives a request from the SMF to establish DRBs for a first PDU session between the MN and the UE for redundant data transmission, then if the MN has modified the security activation setting in the received UP security enforcement information received from the SMF for the first PDU session, then the MN stores the applied UP security activation status used for the DRBs established between the MN and the UE for the first PDU session.

When the MN receives a request from the SMF to establish DRBs for a second PDU session between the SN and the UE for redundant data transmission, then the MN provides the stored 'UP security activation status' to the SN when offloading the DRBs for the second PDU session used for redundant data transmission, instead of the UP security enforcement information received from the SMF. The SN is not allowed to modify the UP security activation status received from the MN. This ensures that the same security setting is applied to the DRBs for the first and second PDU session established with the UE.

Figure 9:
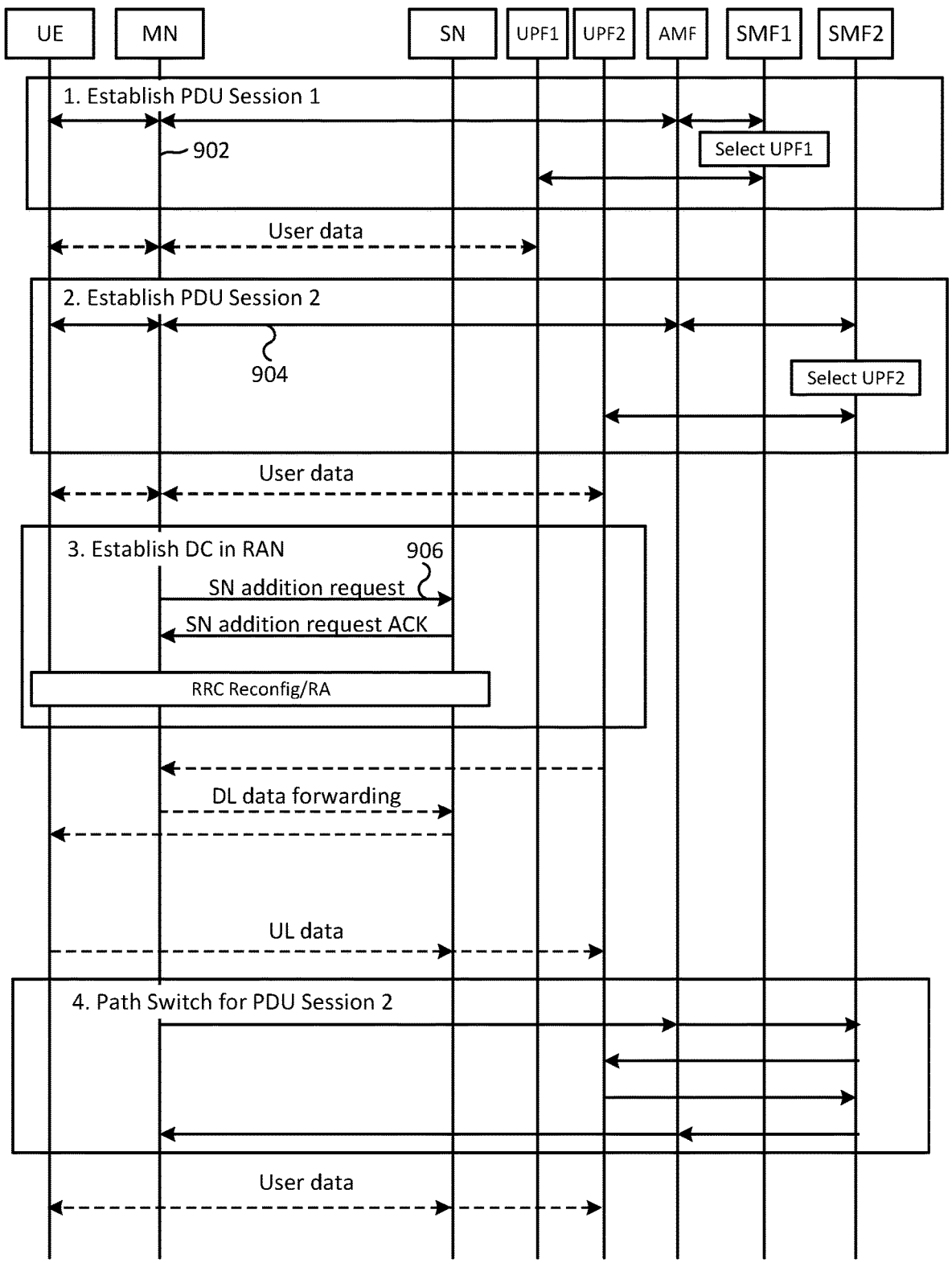

Referring to FIG. 9, a UE initiates Registration procedure with the network.

At step 1, the UE initiates PDU establishment procedure with the network for redundant data transmission for a first PDU session. The SMF determines the UP security enforcement information to be applied for the first PDU session. The SMF provides the UP security enforcement information to the MN. The MN may modify the setting in the received the UP security enforcement information. In that case, the MN stores at 902 the modified setting which the MN used when activating the security for the DRBs for the first PDU session established between the MN and the UE.

For example, if the parameter UP Integrity Protection in the received UP security enforcement information is set to the value 'Preferred' but the MN does not support UP Integrity Protection, then the MN may set the parameter UP Integrity Protection to 'Not Needed'. The MN will not activate UP Integrity protection for the DRB(s) established for the first PDU session between the MN and the UE. But the MN shall then store the 'UP security activation status' which includes the parameter UP Integrity Protection set to 'Not Needed' which was applied and used for the DRB(s) established for the first PDU session between the MN and the UE.

At step 2, the same UE initiates a second PDU establishment procedure with the network for redundant data transmission for a second PDU session. The SMF provides the UP security enforcement information to the MN at 904 when requesting a second PDU session.

When the MN receives a request from the SMF to establish DRBs for a second PDU session between the SN and the UE for redundant data transmission, then the MN provides the stored 'UP security activation status' to the SN at 906 when offloading the DRBs for the second PDU session used for redundant data transmission, instead of forwarding the UP security enforcement information received from the SMF. The SN is not allowed to modify the UP security activation status received from the MN. This would ensure that the same security setting is applied to the DRBs for the first and second PDU session established with the UE—even when the MN has modified the setting in the UP security enforcement information received from the SMF for the first PDU session.

Figure 10:
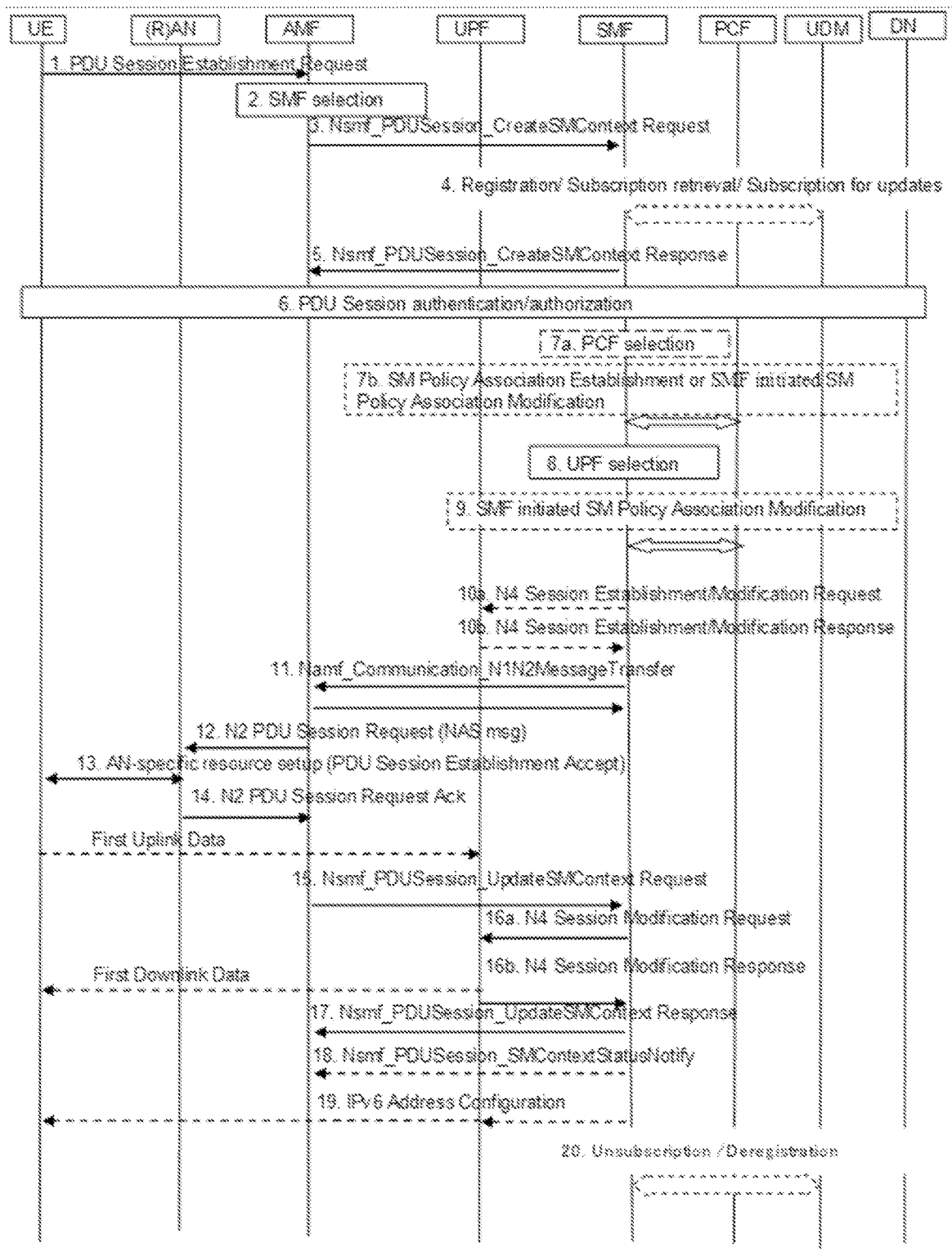
FIG. 10 illustrates aspects of a PDU session establishment procedure in more detail.

FIG. 10 illustrates a signalling flow from TS 23.502 [4] for PDU session establishment.

Steps 1-3 are as described in TS 23.502 [4].

Step 4: The SMF determines whether the PDU Session requires redundancy and the SMF determines the Redundancy Sequence Number (RSN) as described in of 3GPP TS 23.501 [1]. In case the SMF determines that redundant handling is not allowed or possible for the given PDU Session, the SMF may reject the establishment of the PDU session based on local policy.

Steps 5-10 are as described in TS 23.502 [4].

Step 11: SMF to AMF: Namf_Communication_N1N2MessageTransfer (PDU Session ID, N2 SM information (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate, RSN), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es), [Always-on PDU Session]))). If multiple UPFs are used for the PDU Session, the CN Tunnel Info contain tunnel information related with the UPF that terminates N3.

The RSN, where applicable, indicates to the RAN node whether the user plane of the given PDU Session should go via the Master RAN or the Secondary RAN for redundant user plane paths using dual connectivity.

Step 12: AMF to (R)AN: N2 PDU Session Request (N2 SM information, NAS message (PDU Session ID, N1 SM container (PDU Session Establishment Accept))).

Figure 11A:
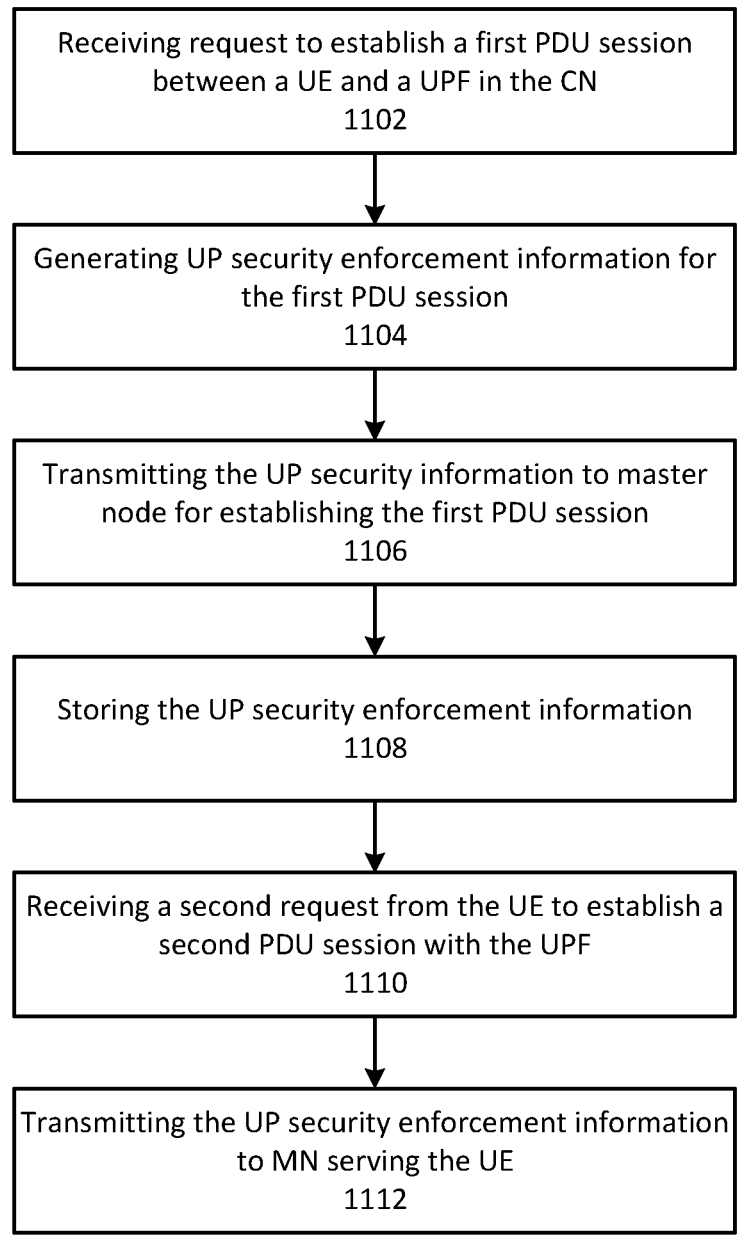
FIG. 11A is a flowchart that illustrates operations of a core network (CN) node according to some embodiments.

Referring to FIG. 11A, a method in a core network of a wireless communication system includes receiving (1102) a first request to establish a first protocol data unit, PDU, session between a user equipment UE and a user plane function in the core network, generating (1104) user plane, UP, security enforcement information, to be applied to the first PDU session and transmitting (1106) the UP security enforcement information to a RAN node to establish the first PDU session. The RAN node may be a master node that is connected to the UE via a data radio bearer. The RAN node may be a gNB or an ng-eNB.

The method further includes storing (1108) the UP security enforcement information, receiving (1110) a second request from a user equipment, UE, to establish a second protocol data unit, PDU, session with a user plane function in the core network, and transmitting (1112) the UP security enforcement information to a master node serving the UE in response to receiving the second request to establish the second PDU session for establishing the second PDU session using the UP security enforcement information.

The UP security enforcement information may be stored by a Session Management Function, SMF, in the core network. In some embodiments, the UP security enforcement information may be stored by a Policy Control Function, PCF, or United Data Management, UDM, function in the core network.

The method may further include selecting a user plane function for terminating the second PDU session.

The second PDU session may be established for redundant data transmission with the first PDU session.

The second PDU session may be carried on a data radio bearer, DRB, established between the UE and a secondary node. The secondary node may be a gNB or an ng-eNB.

Figure 11B:
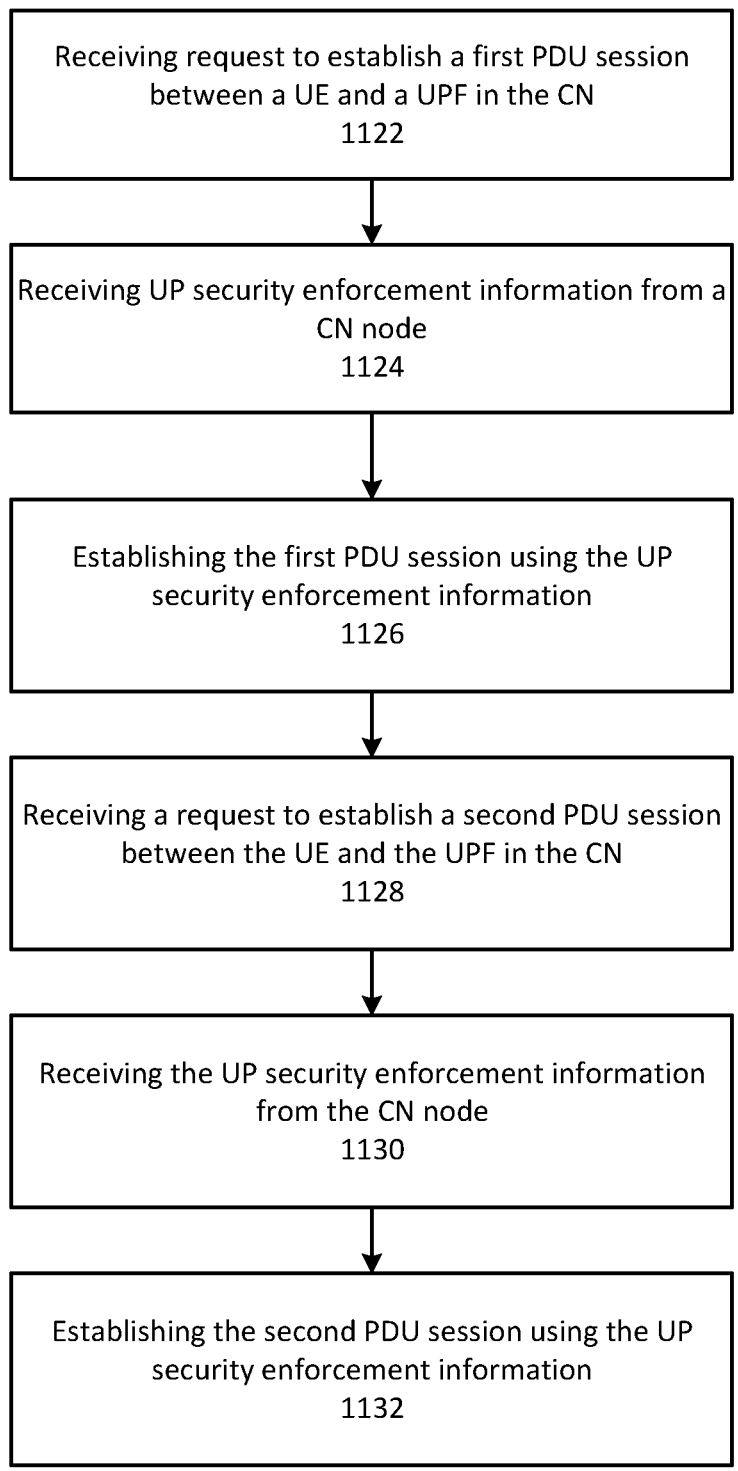
FIGS. 11B and 12 are flow charts illustrating operations of a radio access network (RAN) node according to some embodiments.

Referring to FIG. 11B, a method in a radio access network, RAN, node of a wireless communication system, includes receiving (1122) a first request to establish a first protocol data unit, PDU, session between a user equipment, UE, connected to the RAN node and a user plane function in the core network, and receiving (1124) UP security enforcement information from a core network node, to be applied to the first PDU session. The RAN node establishes (1126) the first PDU session using the UP security enforcement information. The method further includes receiving (1128) a second request to establish a second protocol data unit, PDU, session between the UE and the user plane function in the core network, receiving (1130) the UP security enforcement information from the core network node, and establishing (1132) the second PDU session using the UP security enforcement information.

The RAN node may be a master node, and the method may further include establishing a dual connectivity, DC, connection between the UE and a secondary node, and assigning the second PDU session to the DC connection.

The method may further include transmitting the UP security enforcement information received from the core network node to the secondary node for application to the second PDU session.

Figure 12:
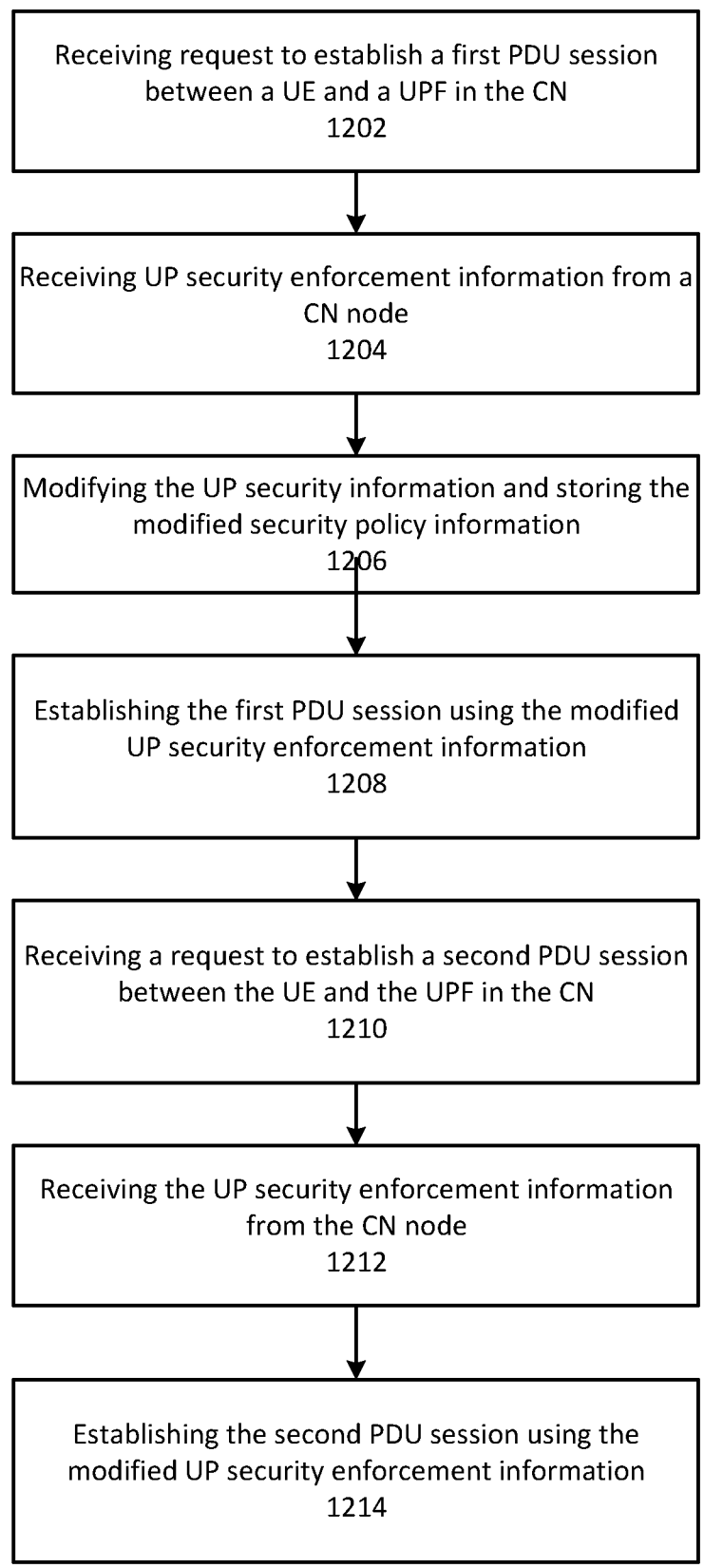

Referring to FIG. 12, a method in a radio access network, RAN, node of a wireless communication system, includes receiving (1202) a first request to establish a first protocol data unit, PDU, session between a user equipment, UE, connected to the RAN node and a user plane function in the core network, and receiving (1204) user plane, UP, security enforcement information from a core network node, to be applied to the first PDU session.

The RAN node modifies (1206) the UP security enforcement information to provide modified UP security enforcement information and establishes (1208) the first PDU session using the modified UP security enforcement information. The method further includes receiving (1210) a second request to establish a second protocol data unit, PDU, session between the UE and the user plane function in the core network, receiving (1212) the UP security enforcement information from the core network node, and establishing (1214) the second PDU session using the modified UP security enforcement information.

The method may further include storing the modified UP security enforcement information.

The RAN node may be a master node, and the method may further include establishing a dual connectivity, DC, connection between the UE and a secondary node, and assigning the second PDU session to the DC connection.

The method may further include transmitting the modified UP security enforcement information to the secondary node for application to the second PDU session.

The second PDU session may be carried on a data radio bearer, DRB, established between the UE and a secondary node.

The core network node may endorse a Session Management Function, SMF.

Figure 13:
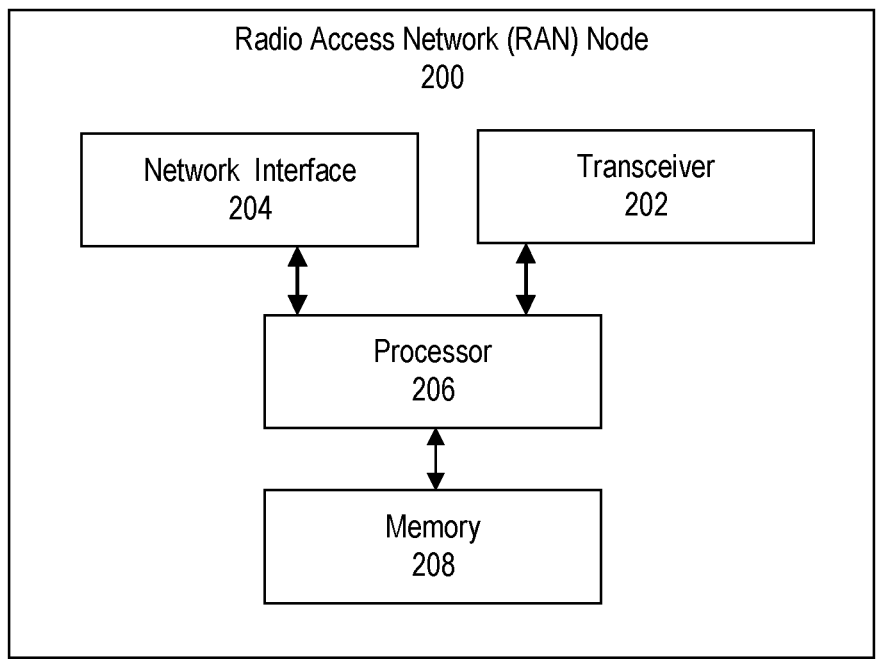
FIG. 13 is a block diagram illustrating an example of a Radio Access Network (RAN) node according to some embodiments.

FIG. 13 is a block diagram of a radio access network (RAN) node 200 according to some embodiments that is configured to perform the operations depicted in FIGS. 11B and 12.

In particular, FIG. 13 depicts an example of a radio access network (RAN) node 200 (also referred to as a base station, eNB, eNodeB, gNB, gNodeB, etc.) of a wireless communication network configured to provide cellular communication according to embodiments of inventive concepts. The network node 200 may correspond to a central unit, a radio unit or a combination of a central unit and a radio unit in a RAN node. As shown, network node 200 may include a transceiver circuit 202 (also referred to as a transceiver) including a transmitter and a receiver configured to provide uplink and downlink radio communications with wireless devices. The network node 200 may include a network interface circuit 204 (also referred to as a network interface) configured to provide communications with other nodes (e.g., with other base stations and/or core network nodes) of the wireless communication network. The network node 200 may also include a processor circuit 206 (also referred to as a processor) coupled to the transceiver circuit 202, and a memory circuit 208 (also referred to as memory) coupled to the processor circuit 206. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

As discussed herein, operations of the network node 200 may be performed by processor 206, network interface 204, and/or transceiver 202. For example, processor 206 may control transceiver 202 to transmit downlink communications through transceiver 202 over a radio interface to one or more UEs and/or to receive uplink communications through transceiver 202 from one or more UEs over a radio interface. Similarly, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations (e.g., operations discussed below with respect to example embodiments). In addition, a structure similar to that of FIG. 10 may be used to implement other network nodes, for example, omitting transceiver 202. Moreover, network nodes discussed herein may be implemented as virtual network nodes.

Figure 14:
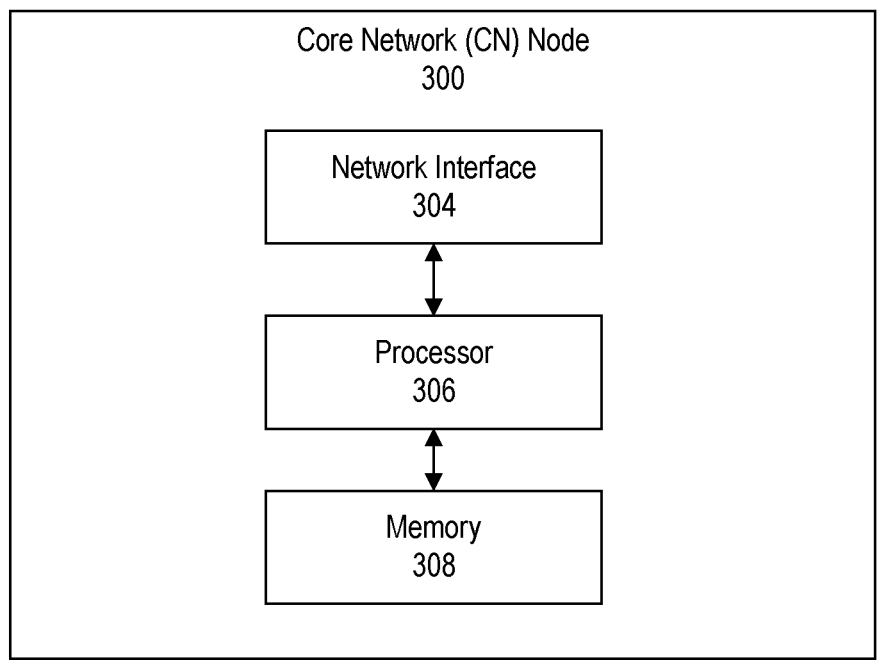
FIG. 14 is a block diagram illustrating an example of a Core Network node according to some embodiments.

FIG. 14 is a block diagram of a core network node 300 according to some embodiments that is configured to perform the operations depicted in FIG. 11A.

In particular, FIG. 14 depicts an example of a core network node 300 of a core network, such as a 5GC or EPC core network. As shown, network node 300 a network interface circuit 304 (also referred to as a network interface) configured to provide communications with other nodes (e.g., with other base stations and/or core network nodes) of the wireless communication network. The network node 300 may also include a processor circuit 306 (also referred to as a processor) and a memory circuit 308 (also referred to as memory) coupled to the processor circuit 306. The memory circuit 308 may include computer readable program code that when executed by the processor circuit 306 causes the processor circuit to perform operations according to embodiments disclosed herein. According to other embodiments, processor circuit 306 may be defined to include memory so that a separate memory circuit is not required.

As discussed herein, operations of the network node 300 may be performed by processor 306 and/or network interface 304. For example, processor 306 may control network interface 304 to transmit communications through network interface 304 to one or more other network nodes and/or to receive communications through network interface from one or more other network nodes. Moreover, modules may be stored in memory 308, and these modules may provide instructions so that when instructions of a module are executed by processor 306, processor 306 performs respective operations (e.g., operations discussed herein with respect to example embodiments). In addition, a structure similar to that of FIG. 14 may be used to implement other network nodes. Moreover, network nodes discussed herein may be implemented as virtual network nodes.

Accordingly, a core network node 300 according to some embodiments includes a processor circuit 306 and a memory 308 coupled to the processor circuit, the memory including machine readable program instructions that, when executed by the processor circuit, cause the network node to perform operations described herein.

Listing of Example Embodiments

Example Embodiments are discussed below. Reference numbers/letters are provided in parenthesis by way of example/illustration without limiting example embodiments to particular elements indicated by reference numbers/letters.

Embodiment 1. A method performed by a core network node in a core network of a wireless communication system, comprising:
  receiving (1102) a first request from a user equipment, UE, to establish a first protocol data unit, PDU, session with a user plane function in the core network;
  generating (1104) user plane, UP, security enforcement information, to be applied to the first PDU session;
  transmitting (1106) the UP security enforcement information to a master node serving the UE for establishing the first PDU session; and
  storing (1108) the UP security enforcement information for use in establishing a subsequent PDU session for the UE.

Embodiment 2. The method of Embodiment 1, further comprising:
  receiving (1110) a second request from a user equipment, UE, to establish a second PDU session with the user plane function in the core network.

Embodiment 3. The method of Embodiment 2, further comprising:
  transmitting (1112) the UP security enforcement information to the master node serving the UE for establishing the second PDU session.

Embodiment 4. The method of any previous Embodiment, wherein storing the UP security enforcement information is performed by a Session Management Function, SMF, in the core network.

Embodiment 5. The method of any previous Embodiment, further comprising:
  selecting a user plane function for terminating the second PDU session.

Embodiment 7. The method of any previous Embodiment, wherein the second PDU session is established for redundant data transmission with the first PDU session.

Embodiment 8. The method of any previous Embodiment, wherein the second PDU session is carried on a data radio bearer, DRB, established between the UE and a secondary node.

Embodiment 9: The method of any previous Embodiment, wherein storing the UP security enforcement information is performed by the core network.

Embodiment 10: The method of Embodiment 9, wherein storing the UP security enforcement information is performed by a Policy Control Function, PCF, or a United Data Management, UDM, function in the core network.

Embodiment 11. A core network node (300), comprising:
  a processor circuit (306);
  a network interface (304) coupled to the processor circuit; and
  a memory (308) coupled to the processor circuit, the memory comprising machine readable program instructions that, when executed by the processor circuit, cause the network node to perform operations comprising operations according to any of Embodiments 1 to 10.

Embodiment 12. A computer program comprising program code to be executed by processor circuit (306) of a core network, CN, node (300) configured to operate in a communication network, whereby execution of the program code causes the CN node (300) to perform operations according to any of embodiments 1 to 10.

Embodiment 13. A computer program product comprising a non-transitory storage medium including program code to be executed by processor circuit (306) of a core network, CN, node (300) configured to operate in a communication network, whereby execution of the program code causes the CN node (300) to perform operations according to any of embodiments 1 to 10.

Embodiment 14. A method performed by a radio access network node of a wireless communication system, comprising:
  receiving (1122) a first request to establish a first protocol data unit, PDU, session between a user equipment, UE, served by the radio access network node and a user plane function in the core network;
  receiving (1124) user plane, UP, security enforcement information from a core network node, to be applied to the first PDU session;
  establishing (1126) the first PDU session using the UP security enforcement information;
  receiving (1128) a second request to establish a second protocol data unit, PDU, session between the UE and the user plane function in the core network;
  receiving (1130) the UP security enforcement information from the core network node; and
  establishing (1132) the second PDU session using the UP security enforcement information.

Embodiment 15. The method of embodiment 14, further comprising:
  establishing a dual connectivity, DC, connection between the UE and a secondary node; and
  assigning the second PDU session to the DC connection.

Embodiment 17. The method of Embodiment 15, further comprising:
  transmitting the UP security enforcement information received from the core network node to the secondary node for application to the second PDU session.

Embodiment 17. The method of any of embodiments 14 to 16, wherein the second PDU session is carried on a data radio bearer, DRB, established between the UE and a secondary node.

Embodiment 18. The method of any of embodiments 14 to 17, wherein the core network node endorses a Session Management Function, SMF.

Embodiment 19. A method performed by a radio access network node of a wireless communication system, comprising:
- receiving (1202) a first request to establish a first protocol data unit, PDU, session between a user equipment, UE, served by the radio access network node and a user plane function in the core network;
- receiving (1204) user plane, UP, security enforcement information from a core network node, to be applied to the first PDU session;
- modifying (1206) the UP security enforcement information to provide modified UP security enforcement information;
- storing (1206) the modified UP security enforcement information for use in setting up a subsequent PDU session for the UE; and
- establishing (1208) the first PDU session using the modified UP security enforcement information.

Embodiment 20. The method of Embodiment 19, further comprising:
- receiving (1210) a second request to establish a second protocol data unit, PDU, session between the UE and the user plane function in the core network;
- receiving (1212) the UP security enforcement information from the core network node; and
- establishing (1214) the second PDU session using the modified UP security enforcement information.

Embodiment 21. The method of embodiment 19 or 20, further comprising:
- establishing a dual connectivity, DC, connection between the UE and a secondary node; and
- assigning the second PDU session to the DC connection.

Embodiment 22. The method of Embodiment 21, further comprising:
- transmitting the modified UP security enforcement information to the secondary node for application to the second PDU session.

Embodiment 23. The method of any of embodiments 19 to 22, wherein the second PDU session is carried on a data radio bearer, DRB, established between the UE and a secondary node.

Embodiment 24. The method of any of embodiments 19 to 23, wherein the core network node endorses a Session Management Function, SMF.

Embodiment 25. A radio access network, RAN, node (200), comprising:
- a processor circuit (206);
- a network interface (204) coupled to the processor circuit; and
- a memory coupled to the processor circuit, the memory comprising machine readable program instructions that, when executed by the processor circuit, cause the RAN node to perform operations comprising operations according to any of Embodiments 14 to 24.

Embodiment 19. A computer program comprising program code to be executed by a processor circuit (206) of a radio access network, RAN, node (200) configured to operate in a communication network, whereby execution of the program code causes the RAN node (200) to perform operations according to any of embodiments 14 to 24.

Embodiment 20. A computer program product comprising a non-transitory storage medium including program code to be executed by a processor circuit (206) of a radio access network, RAN, node (200) configured to operate in a communication network, whereby execution of the program code causes the RAN node (200) to perform operations according to any of embodiments 14 to 24.

Explanations for abbreviations from the above disclosure are provided below.

| Abbreviation | Explanation |
| --- | --- |
| 3GPP | 3rd Generation Partnership Project |
| 5G | 5th Generation |
| AAA | Authentication, Authorization and Accounting |
| ABBA | Anti-Bidding down Between Architectures |
| AF | Application Function |
| AKA | Authentication and Key Agreement |
| AMF | Access and Mobility Management Function |
| AN | Access Network |
| AUSF | Authentication Server Function |
| ARPF | Authentication credential Repository and Processing Function |
| AS | Access Stratum |
| AV | Authentication Vector |
| BBF | Broadband Forum |
| CA | Certificate Authority |
| CN | Core Network |
| C-RNTI | Cell Radio Network Temporary Identifier |
| DN | Data Network |
| EAP | Extensible Authentication Protocol |
| EMSK | Extended Master Session Key |
| eNB | Evolved NodeB (a radio base station in LTE) |
| FAGF | Fixed Access Gateway Function |
| FN-RG | Fixed Network Residential Gateway |
| gNB | A radio base station in NR. |
| HPLMN | Home PLMN |
| HN | Home Network |
| IETF | Internet Engineering Task Force |
| KDF | Key Derivation Function |
| LTE | Long Term Evolution |
| MSB | Most Significant Bit |
| MSK | Master Session Key |
| ME | Mobile Equipment |
| MNC | Mobile Network Code |
| MCC | Mobile Country Code |
| NAS | Non-Access Stratum |
| NF | Network Function |
| NRF | NF Repository Function |
| NEF | Network Exposure Function |
| NSSF | Network Slice Selection Function |
| NPN | Non-Public Network |
| NR | New Radio |
| OCSP | Online Certificate Status Protocol |
| PCF | Policy Control Function |
| PLMN | Public Land Mobile Network |
| RAN | Radio Access Network |
| RFC | Request for Comments |
| SBA | Service Based Architecture |
| SLA | Service Level Agreement |
| SMF | Session Management Function |
| SEAF | SEcurity Anchor Function |
| SUPI | Subscriber Permanent Identity |
| SUCI | Subscriber Concealed Identity |
| TLS | Transaction Layer Security |
| USIM | Universal Subscriber Identity Module |
| UDM | United Data Management |
| UPF | User Plane Function |
| UE | User Equipment |
| VPLMN | Visitor PLMN |
| W-5GAN | Wireline 5G Access Node |
| X2 | Interface/reference point between two eNBs. |
| Xn | Interface/reference point between two gNBs. |

REFERENCES

[1] 3GPP TS 23.501 v. 15.4.0
[2] 3GPP TR 23.725 v. 16.0.0
[3] 3GPP TS 33.401 v. 15.6.0
[4] 3GPP TS 23.502 v. 15.4.1
[5] 3GPP TS 37.340 v. 15.4.0
[6] 3GPP TS 33.501 v. 15.3.1

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
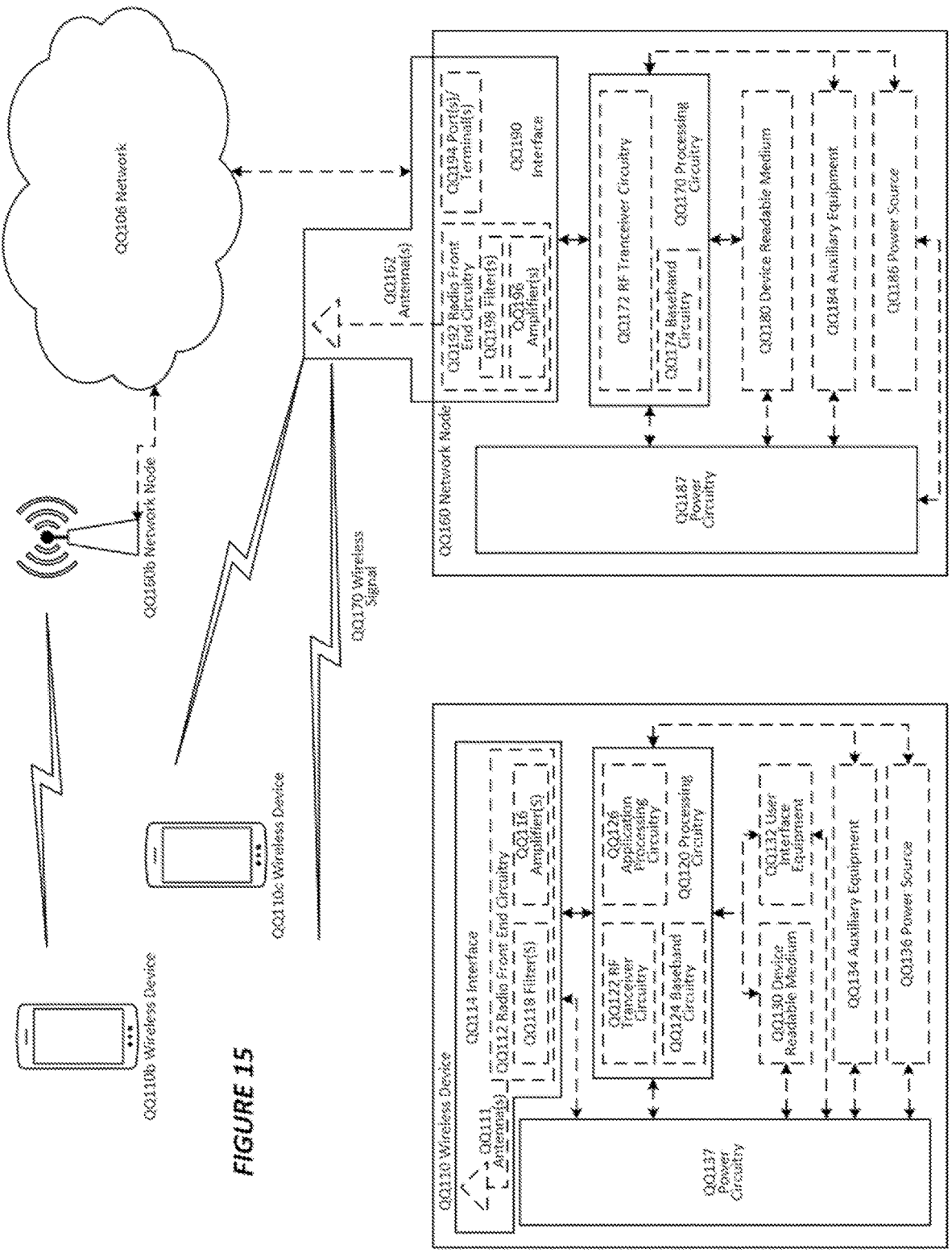
FIG. 15 is a block diagram of a wireless network in accordance with some embodiments.

FIG. 15: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 15 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 16:
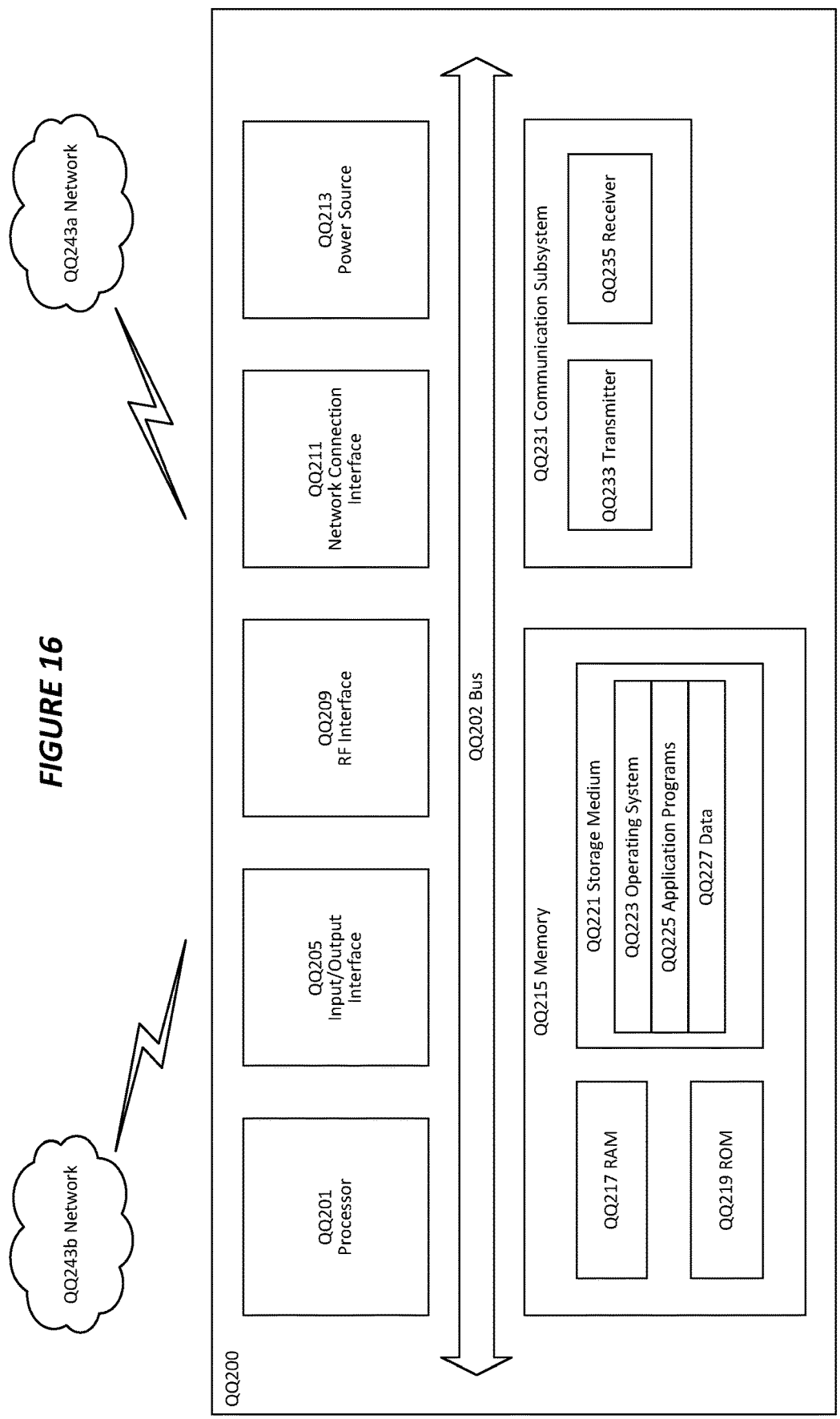
FIG. 16 is a block diagram of a user equipment in accordance with some embodiments.

FIG. 16: User Equipment in accordance with some embodiments

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 16, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 17:
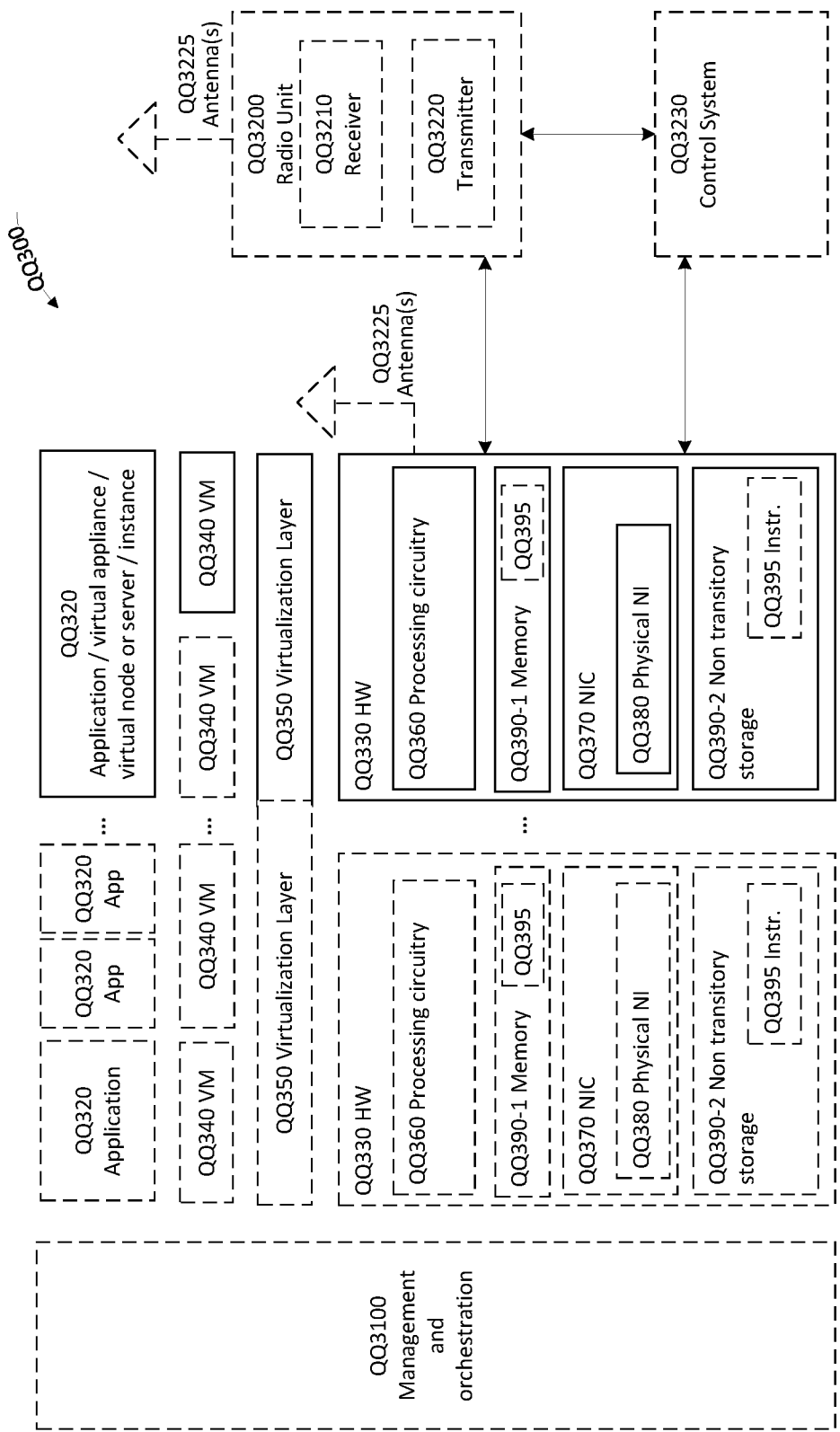
FIG. 17 is a block diagram of a virtualization environment in accordance with some embodiments.

FIG. 17: Virtualization environment in accordance with some embodiments

FIG. 17 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 17, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 17.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 18:
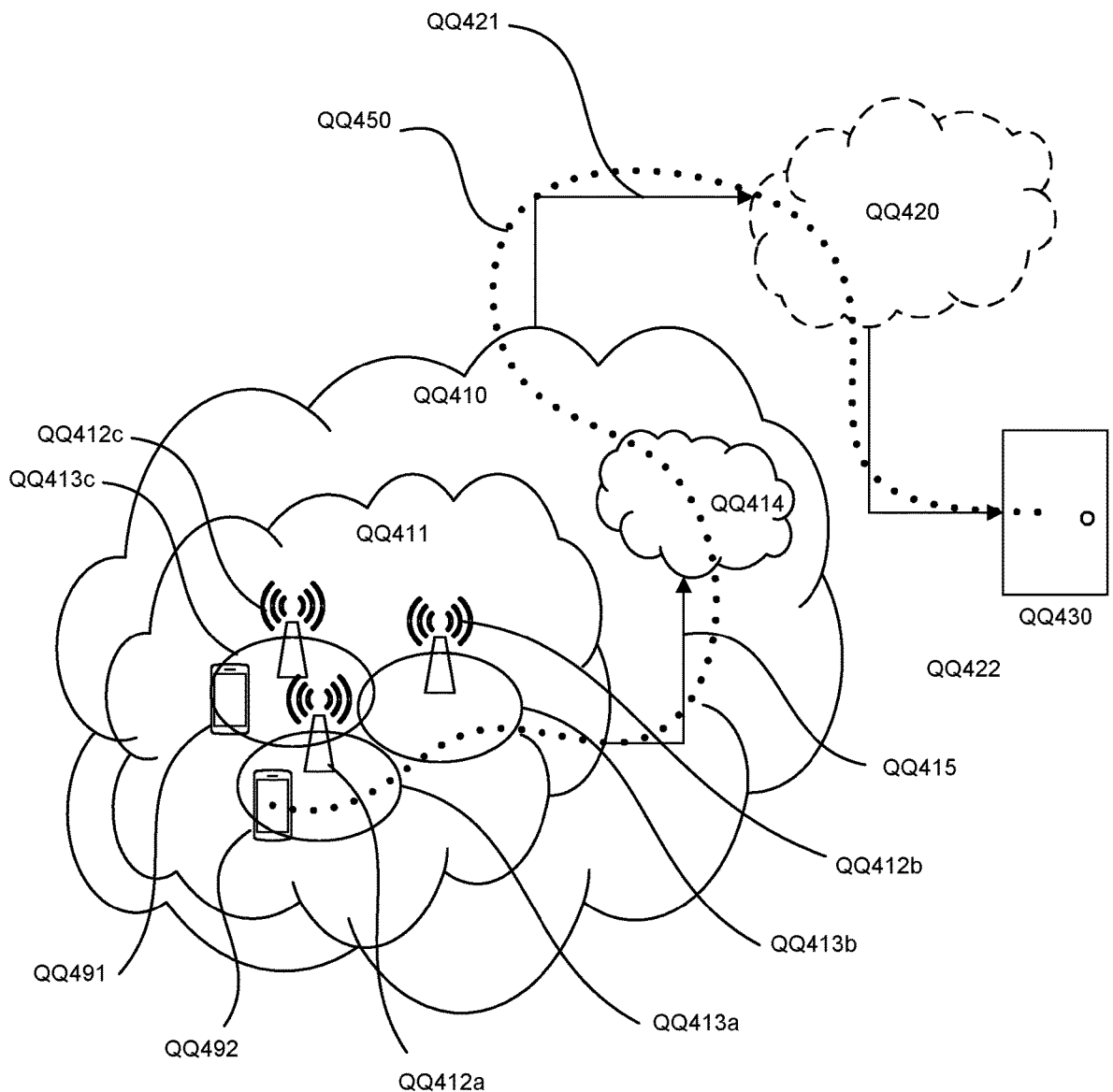
FIG. 18 is a block diagram of a telecommunication network connected via an intermediate network to a host computer in accordance with some embodiments.

FIG. 18: Telecommunication network connected via an intermediate network to a host computer in accordance with some embodiments.

With reference to FIG. 18, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 18 as a whole enables connectivity between the connected UEs QQ491, 00492 and host computer QQ430. The connectivity may be described as an over-the-top (OTT) connection QQ450. Host computer QQ430 and the connected UEs QQ491, 00492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 19:
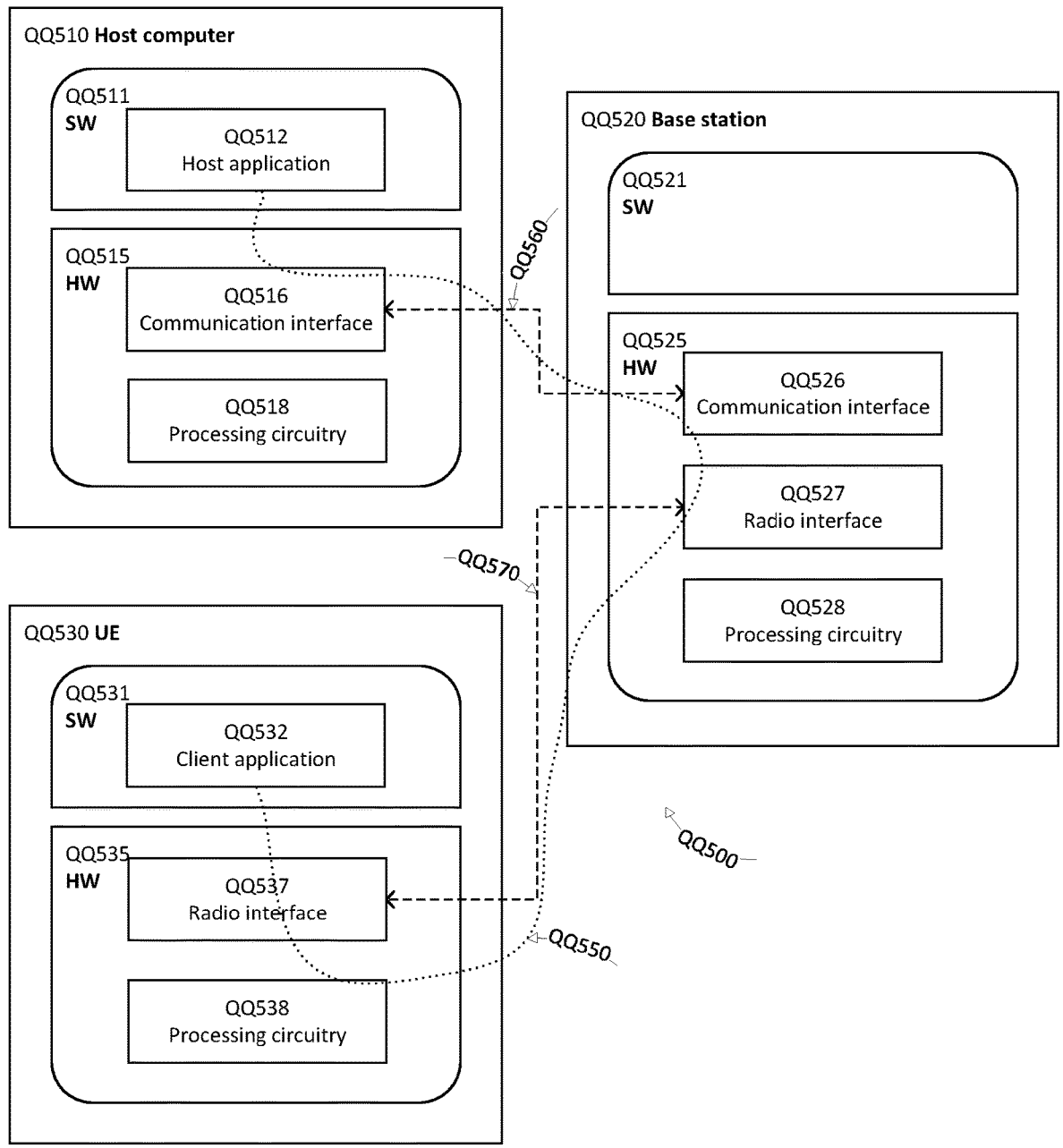
FIG. 19 is a block diagram of a host computer communicating via a base station with a user equipment over a partially wireless connection in accordance with some embodiments.

FIG. 19: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 19. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 19) served by base station QQ520. Communication interface QQ526 may be configured to facilitate connection QQ560 to host computer QQ510. Connection QQ560 may be direct or it may pass through a core network (not shown in FIG. 19) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 19 may be similar or identical to host computer QQ430, one of base stations QQ412a, QQ412b, QQ412c and one of UEs QQ491, QQ492 of FIG. 18, respectively. This is to say, the inner workings of these entities may be as shown in FIG. 19 and independently, the surrounding network topology may be that of FIG. 18.

In FIG. 19, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 20:
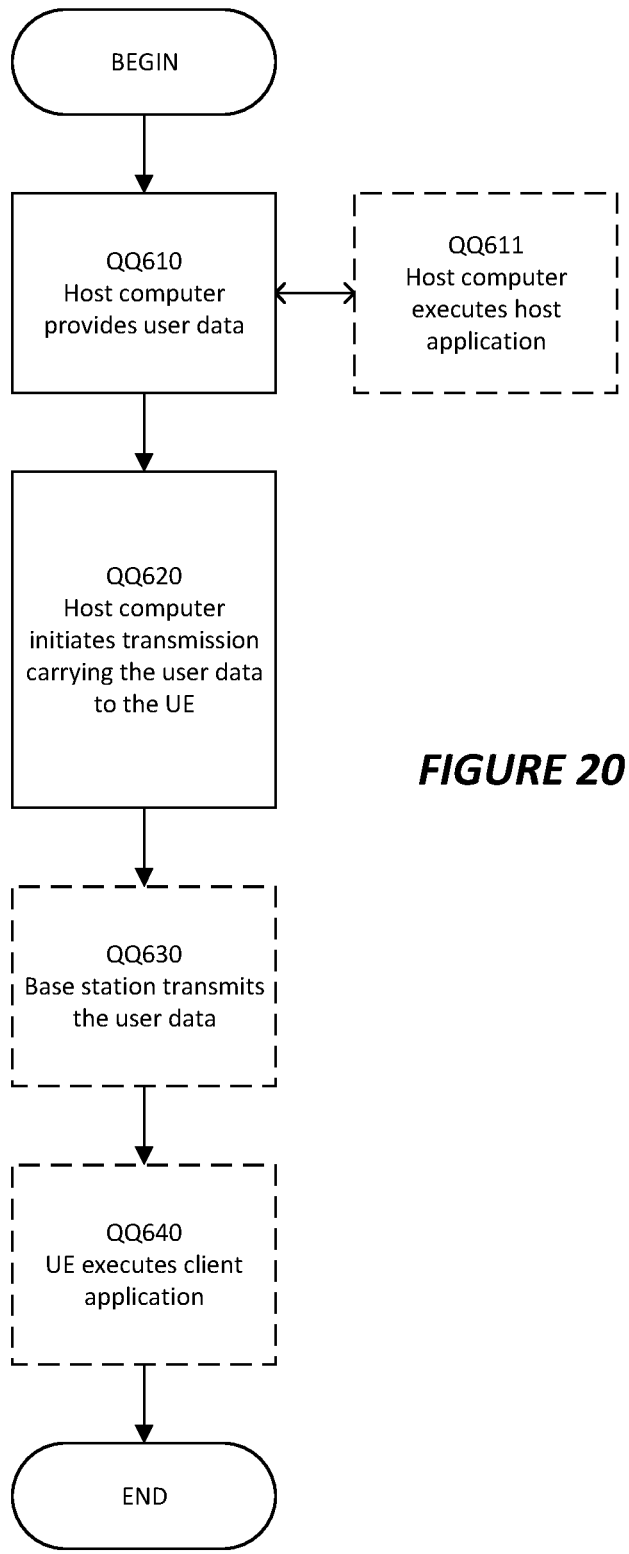
FIG. 20 is a block diagram of methods implemented in a communication system including a host computer, a base station, and a user equipment in accordance with some embodiments.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 21:
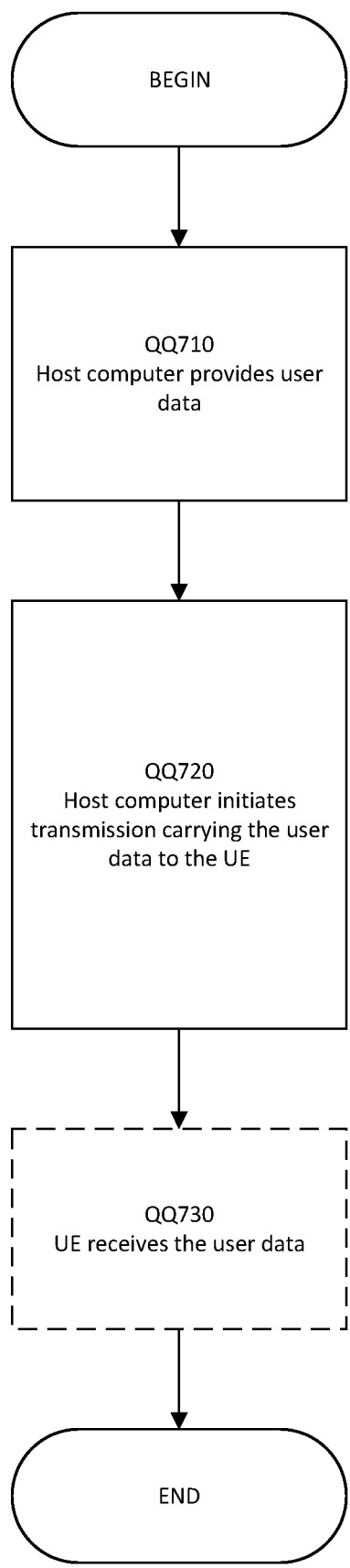
FIG. 21 is a block diagram of methods implemented in a communication system including a host computer, a base station, and a user equipment in accordance with some embodiments.

FIG. 21: Methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 22:
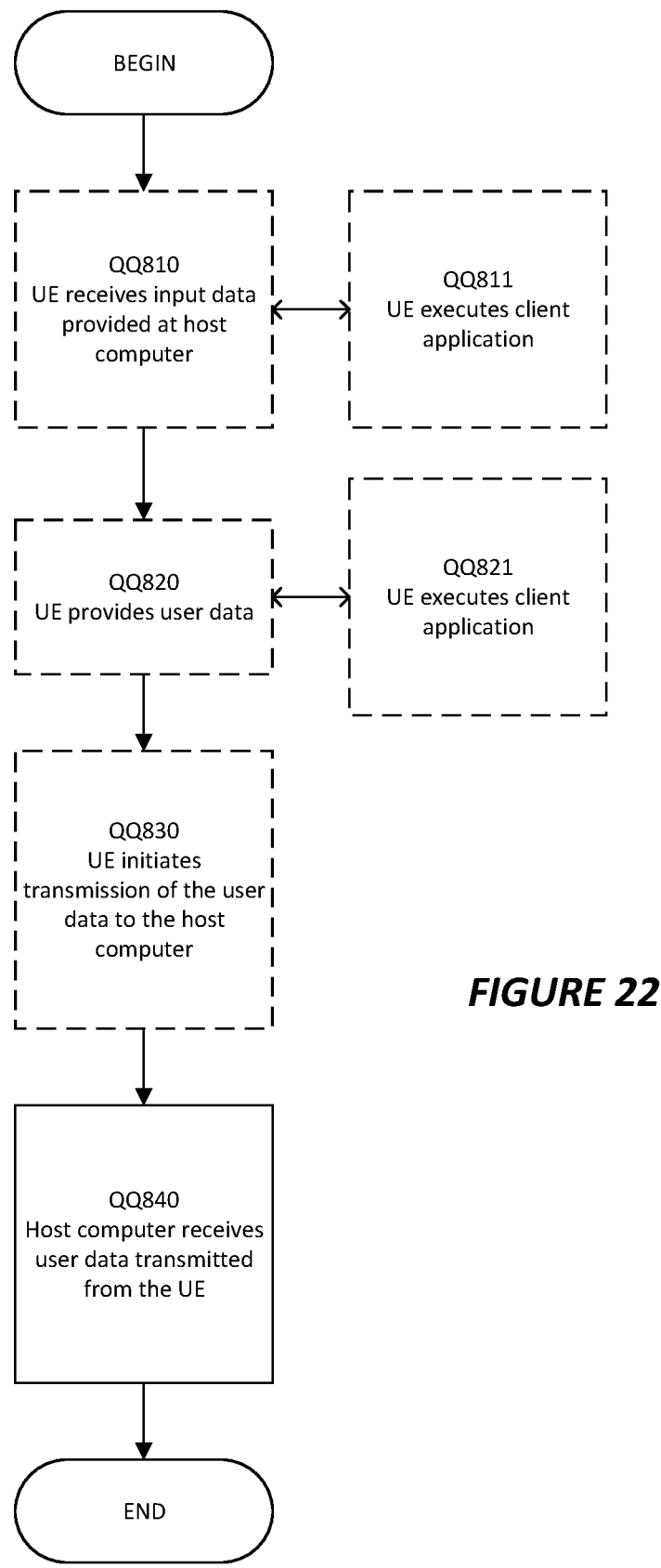
FIG. 22 is a block diagram of methods implemented in a communication system including a host computer, a base station, and a user equipment in accordance with some embodiments.

FIG. 22: Methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 23:
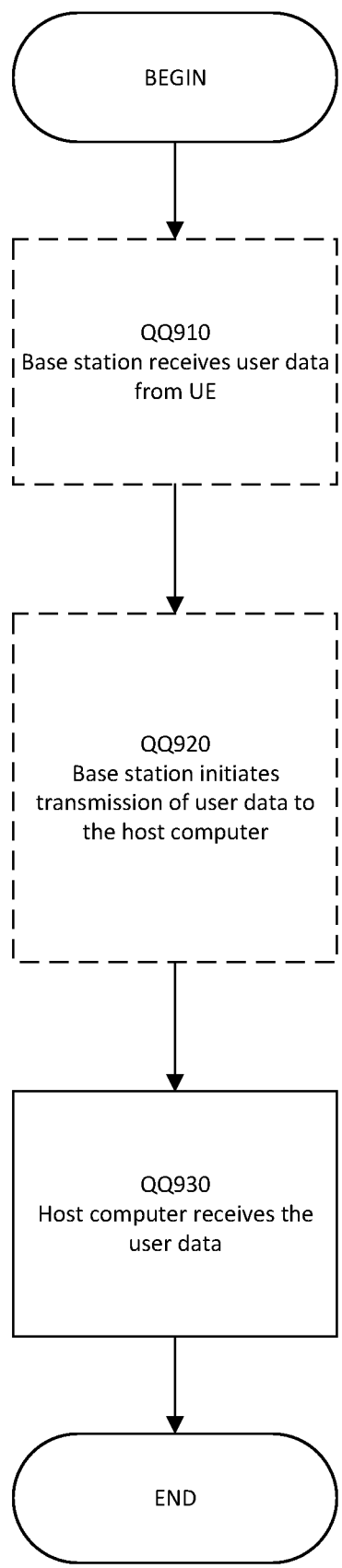
FIG. 23 is a block diagram of methods implemented in a communication system including a host computer, a base station, and a user equipment in accordance with some embodiments.

FIG. 23: Methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a core network node in a core network of a wireless communication system, comprising:
   receiving a first request to establish a first protocol data unit (PDU) session between a user equipment, UE and a user plane function in the core network;
   generating user plane, UP, security enforcement information, to be applied to the first PDU session;
   transmitting the UP security enforcement information to a radio access network (RAN) node for establishing the first PDU session;
   storing the UP security enforcement information for use in establishing a subsequent PDU session for the UE, wherein the stored UP security enforcement information includes UP security setting(s) to apply;
   receiving a second request to establish a second PDU session between the UE and the user plane function; and
   transmitting the stored UP security enforcement information to the RAN node for establishing the second PDU session, wherein the second PDU session is established as a redundant PDU session for ultra-reliable low latency communication (URLLC) and wherein the second PDU session uses the same UP security setting(s) as the first PDU session.

2. The method of claim 1, wherein storing the UP security enforcement information is performed by a Session Management Function (SMF) in the core network.

3. The method of claim 1, further comprising:
   selecting a user plane function for terminating the second PDU session.

4. The method of claim 1, wherein the second PDU session is established for redundant data transmission with the first PDU session.

5. The method of claim 1, wherein the second PDU session is carried on a data radio bearer (DRB) established between the UE and a secondary node.

6. The method of claim 1, wherein storing the UP security enforcement information is performed by the core network.

7. The method of claim 6, wherein storing the UP security enforcement information is performed by a Policy Control Function (PCF) or a United Data Management (UDM) function in the core network.

8. The method of claim 1, wherein the RAN node is a master node.

9. The method of claim 1, wherein the RAN node is a gNB or an ng-eNB.

10. The method of claim 1, wherein the first request is received from the UE.

11. A core network node, comprising:
    a processor circuit;
    a network interface coupled to the processor circuit; and
    a memory coupled to the processor circuit, the memory comprising machine readable program instructions that, when executed by the processor circuit, cause the network node to perform operations comprising:
    receiving a first request to establish a first protocol data unit (PDU) session between a user equipment, UE and a user plane function in a core network;
    generating user plane (UP) security enforcement information, to be applied to the first PDU session;
    transmitting the UP security enforcement information to a radio access network (RAN) node for establishing the first PDU session;
    storing the UP security enforcement information for use in establishing a subsequent PDU session for the UE, wherein the stored UP security enforcement information includes UP security setting(s) to apply; and
    receiving a second request to establish a second PDU session between the UE and the user plane function; and
    transmitting the stored UP security enforcement information to the RAN node for establishing the second PDU session, wherein the second PDU session is established as a redundant PDU session for ultra-reliable low latency communication (URLLC) and wherein the second PDU session uses the same UP security setting(s) as the first PDU session.

12. A method performed by a radio access network (RAN) node of a wireless communication system, comprising:
    receiving a first request to establish a first protocol data unit (PDU) session between a user equipment (UE) connected to the RAN node and a user plane function in a core network;
    receiving user plane (UP) security enforcement information from a core network node, to be applied to the first PDU session;
    modifying the UP security enforcement information to provide modified UP security enforcement information;
    storing the modified UP security enforcement information for use in setting up a subsequent PDU session for the UE, wherein the stored modified UP security enforcement information includes UP security setting(s) to apply;
    establishing the first PDU session using the modified UP security enforcement information;
    receiving a second request to establish a second protocol data unit (PDU) session between the UE and the user plane function in the core network; and
    establishing the second PDU session using the stored modified UP security enforcement information, wherein the second PDU session is established as a redundant PDU session for ultra-reliable low latency communication (URLLC) and wherein the second PDU session uses the same UP security setting(s) as the first PDU session.

13. The method of claim 12, further comprising:
establishing a dual connectivity (DC) connection between the UE and a secondary node; and
assigning the second PDU session to the DC connection.

14. The method of claim 13, further comprising:
transmitting the modified UP security enforcement information to the secondary node for application to the second PDU session.

15. The method of claim 12, wherein the second PDU session is carried on a data radio bearer, DRB, established between the UE and a secondary node.

16. The method of claim 12, wherein the core network node endorses a Session Management Function (SMF).

17. The method of claim 12, wherein the RAN node is a gNB or ng-eNB.

18. A radio access network (RAN) node, comprising:
a processor circuit;
a network interface coupled to the processor circuit; and
a memory coupled to the processor circuit, the memory comprising machine readable program instructions that, when executed by the processor circuit, cause the RAN node to perform operations comprising:
receiving a first request to establish a first protocol data unit (PDU) session between a user equipment (UE) connected to the RAN node and a user plane function in a core network;
receiving user plane, UP, security enforcement information from a core network node, to be applied to the first PDU session;
modifying the UP security enforcement information to provide modified UP security enforcement information;
storing the modified UP security enforcement information for use in setting up a subsequent PDU session for the UE, wherein the stored modified UP security enforcement information includes UP security setting(s) to apply;
establishing the first PDU session using the modified UP security enforcement information;
receiving a second request to establish a second protocol data unit (PDU) session between the UE and the user plane function in the core network; and
establishing the second PDU session using the stored modified UP security enforcement information, wherein the second PDU session is established as a redundant PDU session for ultra-reliable low latency communication (URLLC) and wherein the second PDU session uses the same UP security setting(s) as the first PDU session.

19. A computer program product comprising a non-transitory storage medium including program code to be executed by a processor circuit of a radio access network (RAN) node configured to operate in a communication network, whereby execution of the program code causes the RAN node to perform operations according to claim 12.

* * * * *

UNITED STATES PATENT AND TRADEMARK OFFICE
CERTIFICATE OF CORRECTION

PATENT NO. : 12,231,875 B2
APPLICATION NO. : 17/436327
DATED : February 18, 2025
INVENTOR(S) : Wifvesson et al.

It is certified that error appears in the above-identified patent and that said Letters Patent is hereby corrected as shown below:

In the Specification

In Column 1, Line 3, insert
-- CROSS-REFERENCE TO RELATED APPLICATIONS
This application is a 35 U.S.C. § 371 national stage application of PCT International Application No. PCT/EP2020/055235 filed on February 28, 2020, which in turn claims domestic priority to U.S. Provisional Patent Application No. 62/813,325, filed on March 4, 2019, the disclosures and contents of which are incorporated by reference herein in their entireties. --, therefor.

In Column 2, Line 61, delete "7/a" and insert -- 7/7a --, therefor.

In Column 3, Line 12, delete "7/a" and insert -- 7/7a --, therefor.

In Column 4, Line 48, delete "United" and insert -- Unified --, therefor.

In Column 13, Line 2, delete "United" and insert -- Unified --, therefor.

In Column 16, Line 10, delete "United" and insert -- Unified --, therefor.

In Column 18, Line 50, delete "Transaction Layer Security" and insert -- Transport Layer Security --, therefor.

In Column 18, Line 52, delete "United Data Management" and insert -- Unified Data Management --, therefor.

In Column 35, Line 27, delete "00492" and insert -- QQ492 --, therefor.

In Column 35, Line 30, delete "00492" and insert -- QQ492 --, therefor.

Signed and Sealed this
Twenty-first Day of October, 2025

John A. Squires
*Director of the United States Patent and Trademark Office*

In the Claims

In Column 40, Line 3, in Claim 7, delete "United" and insert -- Unified --, therefor.